United States Patent
Coffman et al.

(10) Patent No.: US 6,839,896 B2
(45) Date of Patent: Jan. 4, 2005

(54) SYSTEM AND METHOD FOR PROVIDING DIALOG MANAGEMENT AND ARBITRATION IN A MULTI-MODAL ENVIRONMENT

(75) Inventors: Daniel M. Coffman, Bethel, CT (US); Rafah A. Hosn, Stamford, CT (US); Jan Kleindienst, Kladno-Krochehlavy (CZ); Stephane H. Maes, Danbury, CT (US); Thiruvilwamalai V. Raman, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 450 days.

(21) Appl. No.: 09/896,057

(22) Filed: Jun. 29, 2001

(65) Prior Publication Data

US 2003/0005174 A1 Jan. 2, 2003

(51) Int. Cl.[7] ............................................. G06F 15/16
(52) U.S. Cl. ...................................................... 719/310
(58) Field of Search ........................... 719/310; 709/318

(56) References Cited

U.S. PATENT DOCUMENTS 5,774,544 A * 6/1998 Lee et al. .................... 713/189
5,940,591 A * 8/1999 Boyle et al. ................. 713/201
6,192,110 B1 * 2/2001 Abella et al. ............. 379/88.01
6,377,913 B1 * 4/2002 Coffman et al. ................ 704/8

FOREIGN PATENT DOCUMENTS

WO    WO 00/20962    4/2000    ............. G06F/9/00

OTHER PUBLICATIONS

Coffman Daniel , Conversational Computing Via Conversational virtual Machine, Oct. 2,1999.*
DeviceNet, Overview And Description, 1994.☐ ☐.*
Takahashi, Eiichichiro, Multi–cast Connection Management system, Apr. 15, 1997.*

* cited by examiner

Primary Examiner—Meng-Al T. An
Assistant Examiner—LeChi Truong
(74) Attorney, Agent, or Firm—F. Chau & Associates, LLC

(57) ABSTRACT

A system and method for providing conversational computing via a protocol for automatic dialog management and arbitration between a plurality of conversational applications, and a framework for supporting such protocol, in a multi-modal and/or multi-channel environment. A DMAF (dialog manager and arbitrator facade) interfaces with one or more applications, and a hierarchical DMA architecture enables arbitration across the applications and within the same application between various sub-dialogs.

54 Claims, 11 Drawing Sheets

SYSTEM AND METHOD FOR PROVIDING DIALOG MANAGEMENT AND ARBITRATION IN A MULTI-MODAL ENVIRONMENT

BACKGROUND

1. Technical Field

The present invention relates generally to a system and method for providing conversational computing and, in particular, to a protocol for providing dialog management and automatic arbitration among a plurality of conversational (multi-modal) applications and an architecture that supports the protocol.

2. Description of Related Art

The computing world is evolving towards an era where billions of interconnected pervasive clients will communicate with powerful information servers. Indeed, this millennium will be characterized by the availability of multiple information devices that make ubiquitous information access an accepted fact of life. This evolution towards billions of pervasive devices being interconnected via the Internet, wireless networks or spontaneous networks (such as Bluetooth and Jini) will revolutionize the principles underlying man-machine interaction. In the near future, personal information devices will offer ubiquitous access, bringing with them the ability to create, manipulate and exchange any information anywhere and anytime using interaction modalities most suited to an individual's current needs and abilities. Such devices will include familiar access devices such as conventional telephones, cell phones, smart phones, pocket organizers, PDAs and PCs, which vary widely in the interface peripherals they use to communicate with the user.

The increasing availability of information, along with the rise in the computational power available to each user to manipulate this information, brings with it a concomitant need to increase the bandwidth of man-machine communication. The ability to access information via a multiplicity of appliances, each designed to suit the individual's specific needs and abilities at any given time, necessarily means that these interactions should exploit all available input and output (I/O) modalities to maximize the bandwidth of man-machine communication. Indeed, users will come to demand such multi-modal interaction in order to maximize their interaction with information devices in hands-free, eyes-free environments.

The current infrastructure is not configured for providing seamless, multi-modal access across a plurality of conversational applications and frameworks. Indeed, although a plethora of information can be accessed from servers over a communications network using an access device (e.g., personal information and corporate information available on private networks and public information accessible via a global computer network such as the Internet), the availability of such information may be limited by the modality of the client/access device or the platform-specific software applications with which the user is interacting to obtain such information.

With the increased deployment of conversational systems, however, new technical challenges and limitations must be addressed. For example, even in current frameworks that support the co-existence of various conversational applications, the possibility to move naturally from one application to another, across all modalities—especially ambiguous modalities such as speech—is not possible without significant modification to the programming model of such applications and the platform on which such applications are executed. For example, explicit (or pre-built) grammars need to be defined for speech applications to shift from one application to the other. Thus, arbitrating in such systems cannot not be performed in an automatic manner without knowledge of the applications that have been installed on the platform.

Furthermore, developing a conversational application using current technologies requires not only knowledge of the goal of the application and how the interaction with the users should be defined, but a wide variety of other interfaces and modules external to the application at hand, such as (i) connection to input and output devices (telephone interfaces, microphones, web browsers, palm pilot display); (ii) connection to variety of engines (speech recognition, natural language understanding, speech synthesis and possibly language generation); (iii) resource and network management; and (iv) synchronization between various modalities for multi-modal applications.

Accordingly, there is need for a system to provide dialog management and automatic arbitration amongst a plurality of conversational (multi-modal) applications, and a protocol that supports such architecture.

SUMMARY OF THE INVENTION

The present invention is directed to a system and method for providing conversational computing via a protocol for automatic dialog management and arbitration between a plurality of conversational applications, as well as a framework for supporting such protocol.

In one aspect of the present invention, DMA (dialog manager and arbitrator) interface comprises:

a root DMA for arbitrating among a plurality of applications to determine an active application for a given user input event; and a plurality of application DMAs, wherein at least one application DMA is associated with each application, for arbitrating among a plurality of sub-dialogs within an application to determine a target application DMA managing the sub-dialog associated with the user input. Preferably, the DMA interface comprises a hierarchical tree structure, wherein arbitration is performed by the DMA interface using a bottom-up approach. The root DMA and application DMAs operate in a hierarchical tree architecture in which the root of the tree is the root DMA. When an application is launched, the application creates an application DMA to manage the main dialog of the application. This application DMA registers with and becomes a child of the root DMA. The application may be programmed to instantiate on or more instances of the application DMA to manage sub-dialogs, which become children of the aDMA that was created when the application was initially launched. Children application DMAs are preferably created in a separate thread.

In another aspect of the present invention, a method for managing dialog of one or more applications comprises the steps of:

instantiating a DMA (dialog manager and arbitrator) interface comprising a hierarchical tree structure comprising a root DMA and one or more application DMAs;

sending, by the root DMA, notification of a user input event to an application DMA;

obtaining, by the application DMA, a symbolic representation of the user input event;

calling, by the application DMA, an application method to perform context resolution of the symbolic representation;

receiving, by the application DMA, a query from the application, wherein the query comprises the results of the context resolution;

determining, by the DMA interface, if the application DMA is currently active based on the query received by the application DMA; and launching, by the application DMA, a callback function associated with the query, if the application DMA is determined to be currently active.

In yet another aspect of the invention, a system and method for provides multi-modal input/output management. When a message/response is to be presented to the user, the I/O manager generates the message in one or more modalities. The I/O manager utilizes a task managers to drive the output generation to generate an abstract output event. The I/O manager converts the abstract output event into one or more modalities for presentation to the user.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

The term "conversational" and "conversational computing" as used herein refers to seamless, multi-modal dialog (information exchanges) between user and machine and between devices or platforms of varying modalities (I/O capabilities), regardless of the I/O capabilities of the access device/channel, preferably, using open, interoperable communication protocols and standards, as well as a conversational programming model (e.g., conversational gesture-based markup language) that separates the application data content (tier 3) and business logic (tier 2) from the user interaction and data model that the user manipulates. Conversational computing enables humans and machines to carry on a dialog as natural as human-to-human dialog.

Further, the term "conversational application" refers to an application that supports multi-modal, free flow interactions (e.g., mixed initiative dialogs) within the application and across independently developed applications, preferably using short term and long term context (including previous input and output) to disambiguate and understand the user's intention. Preferably, conversational applications utilize NLU (natural language understanding).

Multi-modal interactive dialog comprises modalities such as speech (e.g., authored in VoiceXML), visual (GUI) (e.g., HTML (hypertext markup language)), constrained GUI (e.g., WML (wireless markup language), CHTML (compact HTML), HDML (handheld device markup language)), and a combination of such modalities (e.g., speech and GUI). In addition, each modality (or combination of modalities) may be implemented as a full NL (natural language) user interface, resulting in a universal conversational user interface (CUI). It is to be understood that although the above examples are declarative, any of the modality can be programmed imperatively or by any combination of declarative and imperative programming in accordance with the present invention.

Figure 1:
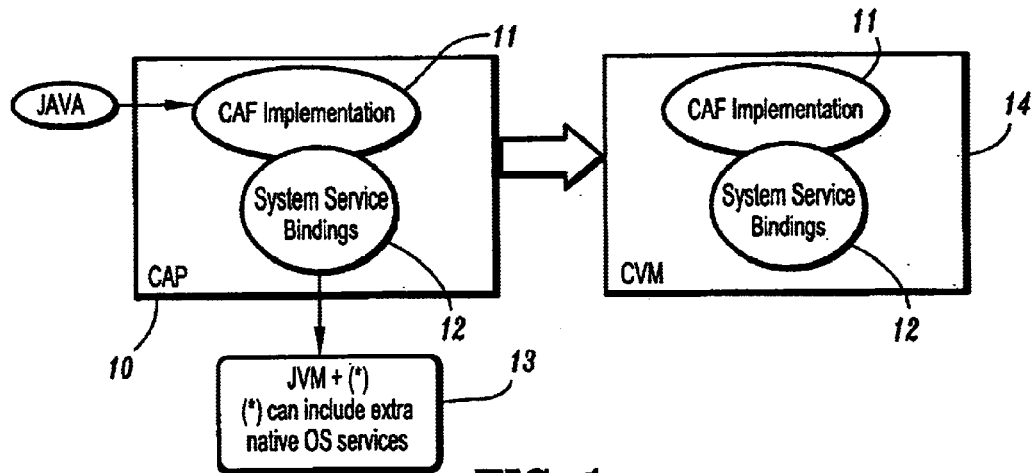
FIG. 1 is a high-level block diagram of a system for providing conversational computing according to an embodiment of the present invention.

The present invention is directed to a system and method for providing conversational computing via a protocol for automatic dialog management and arbitration between a plurality of conversational applications, as well as a framework for supporting such protocol. FIG. 1 is a diagram illustrating a high-level block diagram of a system for providing conversational computing according to an embodiment of the present invention. The system comprises a conversational application framework (CAF) 11 which comprises a set of collaborating components that enable the development of conversational applications. For example, the CAF 11 comprises components that interface with various engines and exposes their underlying functionalities. The CAF 11 comprises components that provide the necessary I/O abstraction for the devices on which it is deployed. Further, as explained below, the system comprises a DMAF (dialog manager and arbitrator facade) that, in accordance with the present invention, provides an interface between conversational applications and the CAF 11.

Preferably, the CAF 11 supports the conversational computing programming model by separating application content (business logic and backend access) from user interaction. Preferred embodiments of an interaction-based programming model are described, for example, in U.S. patent application Ser. No. 09/544,823, filed on Apr. 6, 2000, entitled: "*Methods and Systems For Multi-Modal Browsing and Implementation of A Conversational Markup Language*", which is commonly assigned and fully incorporated herein by reference.

A conversational application platform (CAP) 10 comprises an implementation of the CAF 11 that also binds system services 12 needed by the CAF 11 to a specific native operating system. In a preferred embodiment, wherein the CAF 11 is implemented in Java and its services are bound to a Java Virtual Machine 13 (and, possibly, additional native OS services), this implementation of the CAF 11 is referred to herein as a conversational virtual machine (CVM). It is to be understood that although the present invention is preferably implemented in Java, other operating systems, platforms or virtual machines may be utilized to implement the systems and methods described herein in accordance with the teachings and scope of the invention.

Preferred embodiments of a CVM and corresponding conversational protocols are described in International Appl. No. PCT/US99/22927, filed on Oct. 1, 1999, entitled: *"Conversational Computing Via Conversational Virtual Machine"* (which was filed in the United States National Phase and assigned U.S. Ser. No. 09/806,565), which is commonly assigned and fully incorporated herein by reference. The above-incorporated International Appl. No. PCT/US99/22927 describes various architectures of a CVM (conversational virtual machine) that exposes conversational APIs (application program interface), conversational protocols and conversational foundation classes to application developers and provides a kernel layer that is responsible for implementing conversational computing by managing dialog and context, conversational engines and resources, and conversational protocols/communication across platforms and devices having different conversational capabilities to provide a universal CUI (conversational user interface). A CVM may be implemented as either a stand-alone OS (operating system) or as a platform or kernel that runs on top of a conventional OS or RTOS (real-time operating system), possibly providing backward compatibility for conventional platforms and applications.

In a preferred embodiment of the present invention, the CAP 10 and CAF 11 comprise the components, APIs, and functionalities (and utilize the protocols) that are described in the above incorporated International Appl. No. PCT/US99/22927. More specifically, a preferred embodiment of the present invention is an extension of the above incorporated International Appl. No. PCT/US99/22927 with respect to, e.g., preferred components and protocols for implementing a DMAF (dialog manager and arbitrator facade) that intermediates the interaction between a conversational application and the CAF 11. The DMAF is an API that provides application developers with a single, standard connection point to the underlying CAF components. The DMAF provides a bridge between the application and the other components of the CAF to thereby shield application developers from knowledge of (i) any of the underlying CAF components, (ii) how engine providers hook their engines and devices to the platform, or (iii) where these CAF components and engines are located. Hence, the DMAF promotes ease of development, interoperability across multiple engines and a distributable architecture respectively. Furthermore, the DMAF makes no assumptions on the number, domain or modality of applications built against it. Thus, a DMAF according to the present invention is reusable across any conversational application.

Figure 2:
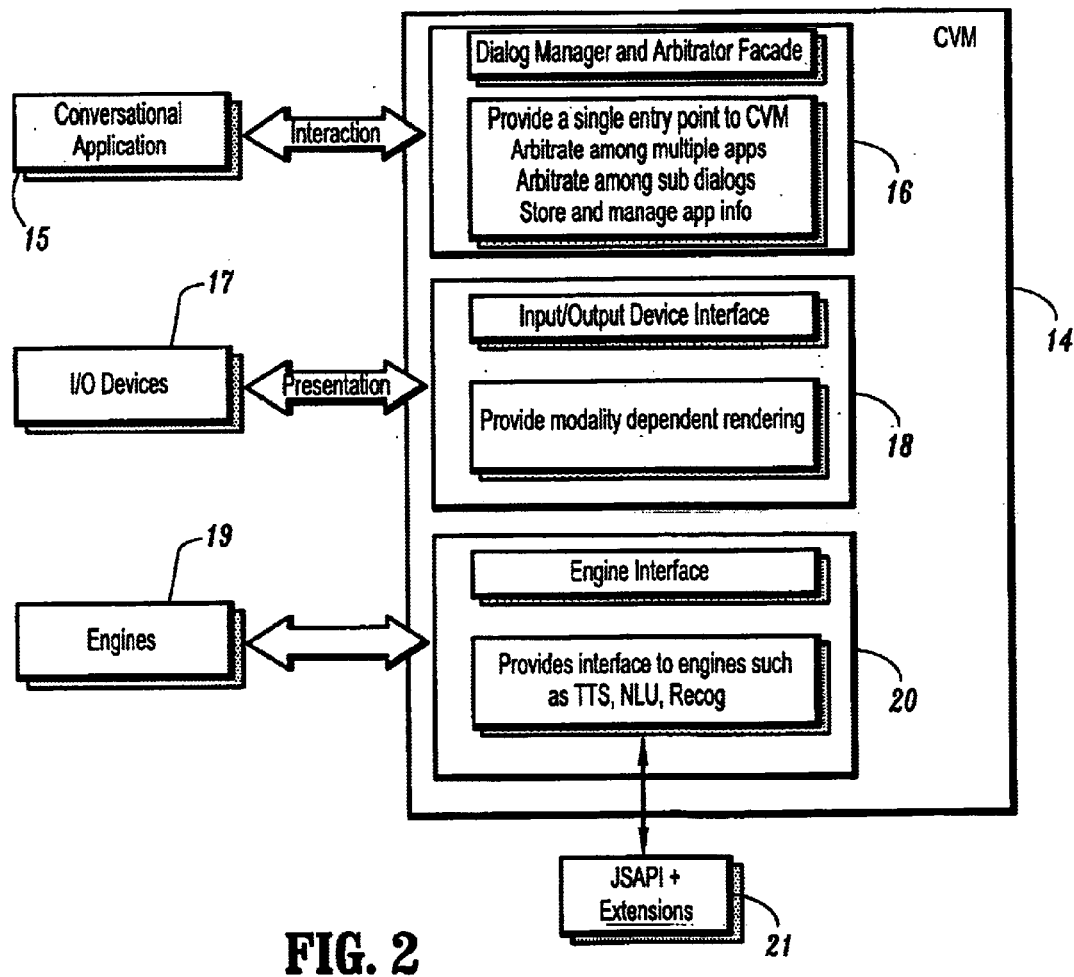
FIG. 2 is a high-level block diagram of a system for providing conversational computing according to an embodiment of the present invention.

Referring now to FIG. 2, a high-level block diagram illustrates a system for providing conversational computing using a DMAF according to an embodiment of the present invention. The system comprises a CVM 14 that comprises a plurality of external interfaces. The external interfaces comprise a DMAF 16 which provides an interface to conversational applications 15 and conversational application developers. In addition, an I/O interface 18 provides an interface to conventional I/O devices 17 comprising, for example, a keyboard, mouse, touch screen, keypad, audio subsystem for capturing speech I/O (audio in/audio out), etc. The I/O API 18 provides device abstractions, I/O abstractions and UI abstractions and provides modality-dependent presentation based on the I/O modality or modalities being utilized. Preferred embodiments of an I/O manager are described below.

Further, an engine interface 20 provides an interface between core conversational engines 19 (e.g., speech recognition, NL parsing, NLU, NLG, TTS and speech compression/decompression engines) and the applications using them. The engine API 20 provides the protocols to communicate with core engines whether they are local or remote. Preferably, the engine interface 20 utilizes JSAPI (Java Speech API) 21 and extensions of such API.

As noted above, the present invention is directed to preferred embodiments and protocols for implementing a DMAF (dialog manager and arbitrator facade). In the following description of preferred embodiments, it is assumed that the DMAF is implemented within a conversational virtual machine (CVM), although a DMAF according to the present invention may be implemented in any platform for providing dialog management over one or more applications. Further, although a CVM comprises various components (as described herein and in the above-incorporated International Appl. No. PCT/US99/22927), only those CVM components that comprise a DMAF and which are related to I/O management will be described in detail. Further, the interfaces by which the DMA components communicate with the application and with the various other CVM components will also be described.

A DMAF 16 according to the present invention provides a plurality of conversational functions. Such functions include:

(i) providing conversational applications a standard way to hook to the CAP (CVM);

(ii) arbitrating between a plurality of conversational applications installed on the platform;

(iii) arbitrating between a plurality of sub-dialogs associated with the same application; and (iv) storing and managing application information.

To provide such functionalities, the DMAF 16 preferably comprises a set of interfaces by which application developers can install and launch their conversational applications on the CVM platform 14. Further, a DMAF 16 comprises a set of interfaces through which application developers can access the arbitration and dialog management facilities provided by the framework.

In general, to manage one or more conversational applications, CVM instantiates a plurality of dialog managers and arbitrators (DMAs) that execute the combined functions of managing dialogs and arbitrating amongst sub-dialog managers. To perform such management and arbitration functions, application developers utilize the DMAF via DMA handles. Once a conversational application is initialized and launched, a DMA instance is created for the main dialog and associated with the application. During execution of the application, the associated DMA will manage user input, pass the user input to the appropriate processing stages, and finally provide the application with an opportunity to handle the symbolic representation of the user intent as obtained from the various stages of such processing.

To interpret user intent, the application can call upon the DMA to obtain additional information such as command returned by NLU, transaction history, current context, etc. The result of this interpretation is sent back to the DMA. Once arbitration has been completed, and if the DMA of the application produced the most likely interpretation among all applications running on the platform, then the DMA will launch the application method handling this interpretation.

The DMA will also manage the output of these methods by passing it to the appropriate components for processing, using an algorithm string, similar to the algorithm string used for input handling (as described below), to control the response processing and generation by the appropriate engines. After processing, an output response will be generated as per the application's requirements and finally presented back to the user. It is to be appreciated that the process of interpreting user intent may be performed by a dialog management function of CVM or another component designed for such purpose. Further, such process may be provided by the platform or as another application (as opposed to being provided by the application provider).

The following discussion outlines preferred mechanisms, components and protocols for implementing a dialog management and arbitration protocol according to the present invention. In general, the present invention provides mechanisms to (i) install conversational applications on the platform, (ii) allow application developers to use the DMAF components, and (iii) allow the DMAF to communicate with other CVM components.

Initialization and Installation Mechanisms

In a preferred embodiment, initialization and installation mechanisms comprise a mechanism for initializing a CVM platform, whereby the various components are instantiated and the platform is ready for application installation. Further, a mechanism is provided for installing a conversational application on a CVM. Another mechanism is provided for running an application on CVM, whereby an application can be launched either via speech or GUI/command line. Further, a mechanism is provided for installing and executing multiple applications on a CVM, whereby a top-level DMA is generated that can arbitrate among multiple applications running the platform and disambiguate between such applications when needed. Details of such initialization and installation mechanisms are provided below.

Dialog Management and Arbitration Mechanisms

Next, the present invention provides a plurality of mechanisms for implementing dialog management and arbitration. Preferably, a mechanism is provided to create new DMA instances, whereby one DMA instance is always generated to manage the main dialog of a given application when the application is first launched. In addition, other DMA instances may be (but do not have to be) generated for the given application to manage sub-dialogs associated with the application.

Further, the DMAF provides a mechanism for arbitrating among sub-dialogs, if any, whereby for a given user input, arbitration mechanism will determine the target DMA instance managing the associated sub-dialog and disambiguate if necessary.

In addition, the DMAF comprises a mechanism for conveying application properties to the CVM through the DMA. These applications can be local or distributed across different devices or machines. Such properties include the resources the application needs such as engine resources (speech recognition, NLU, etc.) data files (such as NLU and grammar objects), the algorithm string for input processing (i.e., the set and order of engines needed for processing the user input). For example, if the user input comprises spoken utterances (voice command), the algorithm string may comprise: front end+speech recognition+NLU. If the user input is a typed command, the algorithm string may be just NLU, etc.

Another mechanism is provided to notify the DMA (and possibly other CVM components) when one or more of the application properties change. For example, a Task manager (which is a CVM component) should be notified of changes to the application properties. As described below, the Task manager is a CVM component that communicates with the conversational engines and, thus, needs to know the algorithm string of the user input and when such string is modified so that the Task manager can instantiate and use the proper engines for processing such user input.

Further, the DMAF preferably comprises a mechanism to convey a command registry to the DMA. The command registry maps queries to callback functions. Applications receive from a given DMA a symbolic representation of the user's intent. After context resolution, the application generates an interpretation of the user's intent. This interpretation is referred to herein a "query." Callback functions comprise application methods associated with interpretations of user intent. Thus, the DMA receiving the query will launch the method associated with it. The application developer can update the command registry at any time.

Another functionality offered by the DMAF is a mechanism for maintaining and updating a list of events that have been generated for a user input. Such events include, for example, input notification, NLU result, query generated, callback response etc. Further, a mechanism is provided for maintaining and updating a list of tasks that have been executed throughout a given session. A task comprises one of more user inputs needed to perform a certain action. So for every task, a subset of the events generated for each user inputs is maintained.

The DMAF further comprises a mechanism for providing application developers with a transaction history to store and retrieve information that they can use in their applications. This information is within the discretion of the application developer, and is meant to group events at a more semantic level that application developers can make use of, for example, in undo and repeat actions. While the preferred embodiment assumes that an application developer specifies what information to store and retrieve, any suitable technique where such decisions are made and managed automatically may be implemented herein (e.g., an extra history/context/meta-information manager, a service of CVM or by another application).

In addition, the DMAF further comprises a mechanism for collaborating with an application to disambiguate a user input event, such as validate results from an NLU result based on expectation history, current state etc. In one embodiment, collaboration is performed by affording access to the various bookkeeping containers maintained by the DMA. An application can then perform context resolution and return the resulting query to the DMA instance. Again, as noted above, in the exemplary embodiment, context resolution is performed by the application (and programmed by the application developer). But context resolution may be provided generically or application specifically by another service or manager or CVM or by another application.

Moreover, the DMAF comprises a mechanism for launching an appropriate application method based on a top scoring query result once it is determined (based on arbitration heuristics) that a given DMA instance is indeed the target of the user input.

Dictation Mechanism

The DMAF preferably comprises a plurality of mechanisms for providing dictation. During a dictation session, mechanisms are provided that allow a DMA (which is responsible for dictation application) to inform a top level DMA to send all user input notification to the DMA only. Preferred mechanisms for providing this dictation functionality are as follows.

A notification method is preferably provided that is utilized by a DMA to notify the top level DMA that the DMA is commencing dictation and for the top level DMA to send all user input notification only to the DMA. Further, a notification mechanism is preferably provided to terminate the dictation and resume input notification to all DMAs. In one embodiment, a user will specifically stop dictation via GUI input or voice command. When the user terminates dictation, the DMA managing the dictation application informs the top level DMA of such termination, and then the top level DMA will resume sending user input to all registered applications.

Another mechanism relating to dictation comprises a method to ensure that an application in a dictation mode relinquishes input control when a user asks to stop dictation. This is preferable so as to prevent greedy applications from not allowing other applications on the platform to receive user input.

In another embodiment, the platform (service or other application) can provide additional mechanisms to automatically determine the beginning and end of dictation. The teachings herein would encompass the DMA and applications associated with this embodiment.

Context Resolution Mechanisms

The DMAF further comprises a plurality of mechanism to provide context resolution. Context resolution, which is preferably based on current state, history and focus, can be used to disambiguate queries. For example, disambiguating an input of the form "open her mail", wherein the pronoun her refers to the last person the user was talking about, can be performed by exploring the events in the various histories provided in the DMA and discovering that the last name used was "Mary". If this association can be found, then the previously ambiguous command open_mail (sender=her) becomes an unambiguous command open_mail (sender= Mary). This unambiguous command may then be sent to the backend application, or processed, without requiring further disambiguation dialog.

This process of association, however, requires the ability to interpret an application's information. It is preferable, however, to keep the DMA as generic as possible, but yet allow the DMA to be powerful enough to do context resolution.

To provide such context resolution functionality, the DMAF provides various methods that are implemented by a DMA. One method implemented by the DMA allows the DMA to maintain and manage application information in various histories, and provide application developers access to such histories. Another method implements the security mechanisms necessary to ensure that a given application modifies or accesses events that relate only to the given application and maintain container integrity. Accordingly the user or application developer can specify information that can be shared with other applications and information that should be shared only with specific applications. Methods can be used to identify such friend, public and private application for a given information or information type and the security or sharing policy that should be utilized accordingly.

Another method provides one or more context-resolver protocols for the application. Preferred context resolver strategies will not be discussed in detail. However, independently of the method used, the resulting DMAF is within the teachings of this invention. Again these methods can be provided by CVM, by the application developer or by other applications. They can also be considered as part of the DMA or external to the DMA. The application developer may use any one of the methods provided by the DMAF or implement his own.

DMA Architecture

The present invention provides a mechanism to allow DMA instances to communicate with one another. Indeed, in a preferred embodiment, to provide arbitration across multiple applications and within the same application between various sub-dialogs, a hierarchical DMA architecture is preferably implemented.

Depending on the security settings of the loaded application, different applications may or may not be able to exchange information (context, or user input or user input etc . . . ) between their respective aDMAs. When applications can not share information (e.g., because they are provided by different providers and involve sensitive information), in extreme cases, it may be required to restrict arbitration to friend applications. To switch from a state wherein the focus is on one cluster of friend applications to another cluster would require an explicit command to the platform to perform such a switch. Past context may be lost. This is similar to the mechanism used for dictation as discussed below.

Figure 3:
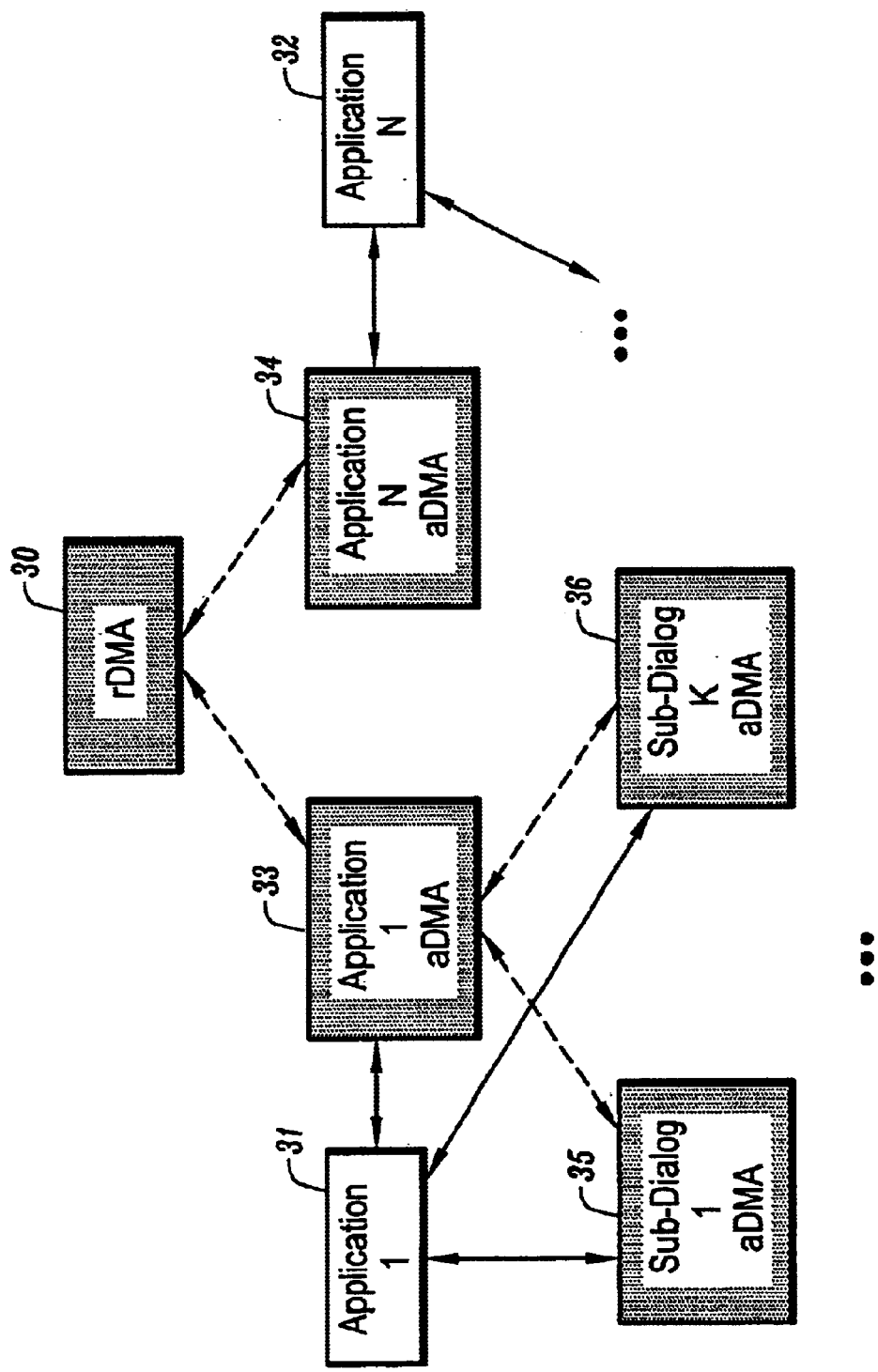
FIG. 3 is a block diagram of a hierarchical DMA (dialog manager and arbitrator) according to an embodiment of the present invention.

Referring now to FIG. 3, a block diagram illustrates a hierarchical DMA structure that is implemented by the DMAF according to an embodiment of the present invention. In this embodiment, a top-level DMA 30 instance arbitrates between a plurality of applications 31 and 32 that are installed on the CVM platform. A top-level DMA instance is referred to herein as a "root DMA instance" or "rDMA". Each application 31 and 32 creates at least one instance of a DMA to manage its main dialog. For instance, application 31 creates a DMA instance 33 and application 32 creates a DMA instance 34. These DMA instances 33 and 34 are children of the top-level DMA instance 30. A DMA instance created for a particular application is referred to herein as an "application DMA instance" or "aDMA." The hierarchical architecture depicted in FIG. 3 can be further expanded to create new instances (e.g., within an application's sub dialog) of a given aDMA. For instance, new aDMA instances 35 and 36 of aDMA 33 are generated to manage sub dialogs. These aDMA instances 35 and 36 are children of the aDMA 33 that manages the main dialog of the application 31.

Thus, in FIG. 3, the rDMA 30 is at the top of the tree and it arbitrates among all applications installed on the platform. The aDMA managing the main dialog of a given application is a child of the rDMA. All subsequent aDMAs created for an application become descendants of the aDMA managing the main dialog.

To receive dialog management services, an application must register with the rDMA 30 to obtain an aDMA handle. Preferably, registration occurs when the application is launched. The rDMA 30 in the architecture of FIG. 3 provides a plurality of services. For instance, the rDMA 30 maintains a list of all registered aDMAs and tracks which of the registered aDMAs is active. An active aDMA is an aDMA that is currently "in-focus." In one embodiment, there is at most one active aDMA per dialog turn. In another embodiment wherein the DMAF supports multiple actions for one user input, there may be more than one active DMA per dialog turn.

Further, the rDMA 30 associates I/O notification events with user inputs and tracks them in history. The rDMA 30 tracks focus changes and tracks events that are pushed into history by children. Preferably, events are pushed by aDMAs as part of regular bookkeeping. In addition, the rDMA 30 pulls children for events stored in their history if requested by a particular child. For example in cases of disambiguation, a child aDMA may ask its parent (the rDMA in this case) to pull its children for some information that may be used in disambiguation. Depending on the security settings set by each of the children, applications or sub-dialog, the rDMA may accept or refuse to provide such information. The security settings can be provided at installation or dynamically evolve with time. These properties can be set through the DMAF interface with each conversational application. When the application refuses sharing, explicit focus switch commands from the user are required.

Various information is exchanged between the rDMA and aDMAs. Such information includes, for example: (i) information to register/de register aDMAs with rDMA (ii) I/O notification events that are sent to registered aDMAs; (iii) top-scoring query received by the rDMA from all its children aDMAs to arbitrate among the aDMAs to decide which of the aDMAs is currently active; (iv) notification that is sent to an active aDMA to proceed to act on an I/O transaction (and in parallel, notifications that are sent to non-active aDMAs to not proceed); (v) confirmation of context or focus changes; (vi) requests for the next prompt or the rDMA can ask its children aDMAs for attributes to be sent to an NLG (natural language generation) engine so as to construct a prompt; and (vii) pulling children for information stored in their histories.

When the DMAs are distributed, the above information can be encrypted. Because such information can be very sensitive, it is possible that the DMA client can not be trusted. Different solutions can be provided to address this issue. For instance, in one embodiment, a mechanism can be provided to specify friend applications that can exchange information and unfriendly applications that can not exchange information. Friend applications could be developed by a same provider. One mechanism for specifying friendly application comprises certification by digital certificate or other certification mechanisms. This implies that while dialog management can be performed within the application, arbitration across applications is limited to the friend applications. As noted above, a switch to another group of friend applications preferably requires an explicit command by the user. For instance, this is a command that the user address explicitly (such as "switch to . . . ") or implicitly (such as clicking on other window) to CVM. The notion of what is and what is not a friend application can rely on multiple criterion that can be static or dynamic (e.g., a function of the current application, application state or other external considerations, including user preferences).

Another solution is to use "sealed" aDMA code that can certify its integrity, and exchange encrypted information with its children and parents. The term "sealed" means that it does not reveal this information to the outside through any of its interface and encrypts it locally. This "sealed" approach is applicable when the DMA performs all the interpretation, dialog management and context management internally (generically or application specific), so that it does not have to be passed to the outside.

It is to be appreciated that other solutions may be implemented. Whatever solution is implemented, it should be understood that the resulting DMA is anticipated by the current invention.

The rDMA preferably performs arbitration among the plurality of aDMAs using a bottom-up approach. With this approach, notification of a user input is passed from the rDMA to each registered aDMA child, which in turn, pass the user input to associated children. To increase the efficiency of this approach, a pruning mechanism is preferably provided. In one embodiment, user input is passed to all registered aDMAs that have been active (i.e. in-focus) for the past "i" turns where "i" is some definable number. Any pruning trained, optimized or heuristic method (static or dynamic) can be used without changing the DMA architecture and execution principles. In the following discussion, it is assumed that no pruning is performed so that all registered aDMAs actually get notified.

Furthermore, heuristics, deterministic or statistic algorithms for providing arbitration are preferably pluggable. Thus, the arbitration strategies are dynamically loaded when the framework is initialized. Preferably, developers that install the CAF can install their own arbitration strategies. Again it is possible that the arbitration algorithm be provided by the platform, CVM services or external applications. They can be generic or specific to the loaded applications. They can be considered as part of the DMA or external to it.

Figure 4:
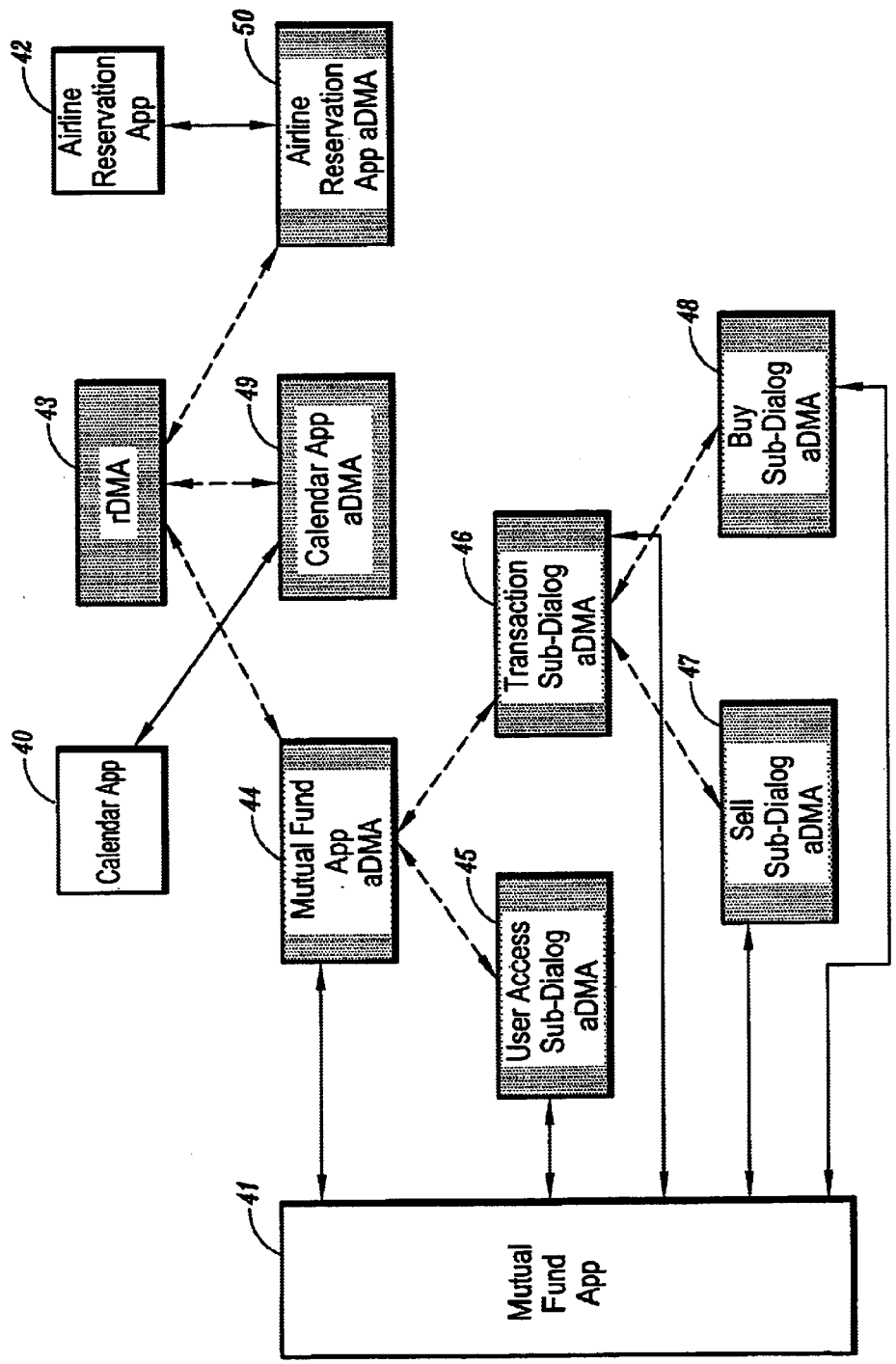
FIG. 4 is a block diagram of an exemplary method for providing dialog management and arbitration using a DMA structure according to an embodiment of the present invention.

FIG. 4 is a block diagram of an exemplary method for providing dialog management and arbitration. More specifically, FIG. 4 illustrates the creation of three applications: (i) a calendar application 40; a mutual fund application 41 and an airline reservation system application 42. All of the applications 40, 41 and 42 are managed by a rDMA 43. For the mutual fund application 41, one aDMA 44 is generated to manage the main dialog and two aDMAs are instantiated from the aDMA 44 to handle the user access sub-dialog and the mutual fund transaction sub-dialogs, i.e., the sub-dialog aDMA 45 to handle user access and the sub-dialog aDMA 46 to handle mutual fund transactions. Further, the Transaction dialog is further subdivided such that a Sell transaction and a Buy transaction are handled, respectively, by two different aDMAs 47 and 48. More specifically, the sub-dialog under the transaction dialog to handle selling of mutual funds is managed by aDMA 47 and the sub-dialog under the transaction dialog to handle buying of mutual funds is managed by aDMA 46.

Moreover, in the exemplary embodiment of FIG. 4, both the calendar application 40 and airline reservation application 42 respectively generate one aDMA instance 48 and 50 to handle the main dialog associated with the corresponding application.

DMA Components

Figure 5:
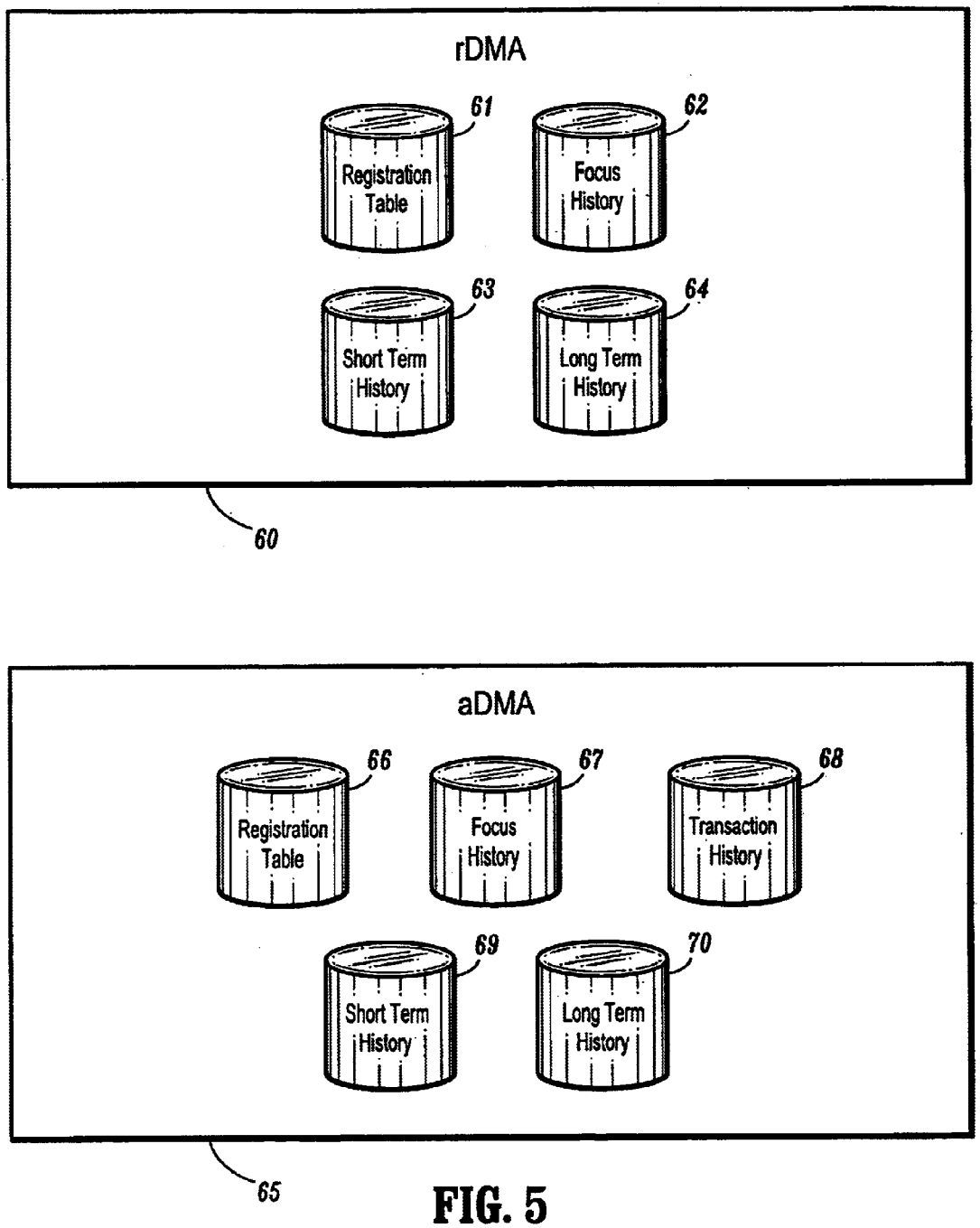
FIG. 5 is a diagram illustrating information that is maintained by a DMA according to an embodiment of the present invention.

The following discussion is directed to preferred components of the DMA that are utilized for providing bookkeeping services. FIG. 5 is a diagram illustrating preferred components of an rDMA and aDMA that are employed for such purposes according to an embodiment of the present invention. In other embodiments of the present invention, these components can be excluded or combined differently, and/or other components can be introduced without affecting the principles of the DMA. An rDMA 60 comprises a registration table 61 which maps registered children aDMAs with associated applications that the aDMAs are serving. An aDMA 65 comprises a registration table 66 that is utilized to associate children aDMAs with the sub-dialogs they are serving. The rDMA 60 further comprises a focus history 62 that stores records of active aDMAs throughout a given session. Likewise, the aDMA 65 comprises a focus history 67 that stores records of active children aDMAs throughout a given session.

In addition, the aDMA 65 comprises a transaction history that provides an application developer a container in which they can store completed transactions. These completed transactions may group various tasks that share some semantic meaning. It is to be understood that in a preferred embodiment, the information that is stored in the transaction history 68 is entirely at the discretion of the application developer. This transaction history 68 can be used by applications to, e.g., code "undo", "repeat", memorize, summarize, actions. For example, to code an "undo" operation, an application may use the transaction history to record all the steps taken to achieve a certain transaction. When a user wants to "undo" his last transaction, the application may take the list of tasks it has recorded for that transaction and undo each one in reverse order, thus reinstating the application state as it was before the user accomplished the transaction.

Further, the rDMA 60 comprises a short term history store 63 which maintains information such as (i) I/O Notification Events, (ii) which aDMA(s) receive I/O notification (again, it is assumed that all registered aDMAs will receive the I/O notification events although in another embodiment which utilizes a pruning mechanism, only a subset of the registered aDMAs will get the notification, which subset can be determined by some heuristic, trained, deterministic or statistical optimization algorithm, etc: in the heuristic case, a list is maintained of registered aDMAs that receive the I/O notification), (iii) which aDMA received "go ahead and execute task" notification (i.e., what is the current active aDMA), (iv) output request notification and which aDMA sent it, (v) a task descriptor sent by an aDMA when a task has been executed (the task descriptor comprises a subset of events generated for a given task (see LHT in aDMA)).

The aDMA 65 comprises a short term history store 70 that stores all the events generated for a particular state in the dialog. Such events comprise: (i) input notification events; (ii) Task manager notification events; (iii) NLU results (or whatever results comes back from engines); (iv) the result of context resolution (this result is passed by the application—the application will obtain access to the LHT, STH, focus history and to determine what is the actual query. This may result in a change to the list of feature/value pairs already filled. This information is accessible to the aDMA through the application context object); (v) query sent back to parent DMA (can be parent aDMA or rDMA if this is the main aDMA); and (vi) parent response after focus computation.

The short term history is flushed when a call back function returns. A subset of what is contained in the short term history is then placed in a descriptor and pushed onto the long term history as described below.

The rDMA 60 further comprises a long term history 64 that stores Task descriptors of inactive aDMAs. That is, when a dialog terminates, the task descriptors in the STH for a particular aDMA get moved over to the LTH. The aDMA 65 comprises a long term history 70 that stores the main events that lead to the execution of a task. Whereas the short term history stores information at the level of each state in a dialog, the long term history would store information at the level of the entire dialog. Therefore, when a task has been completed and the dialog is in a new state, a subset of the events in the short term history will be pushed onto the long term history. This subset of events can be grouped in a descriptor object, which is then tagged with the I/O transaction ID and pushed onto long term history. The subset of events comprise: (i) I/O Input Notification Events; (ii) Query Object; and (iii) a callback response.

DMAF Interaction with CAF Components

Figure 6:
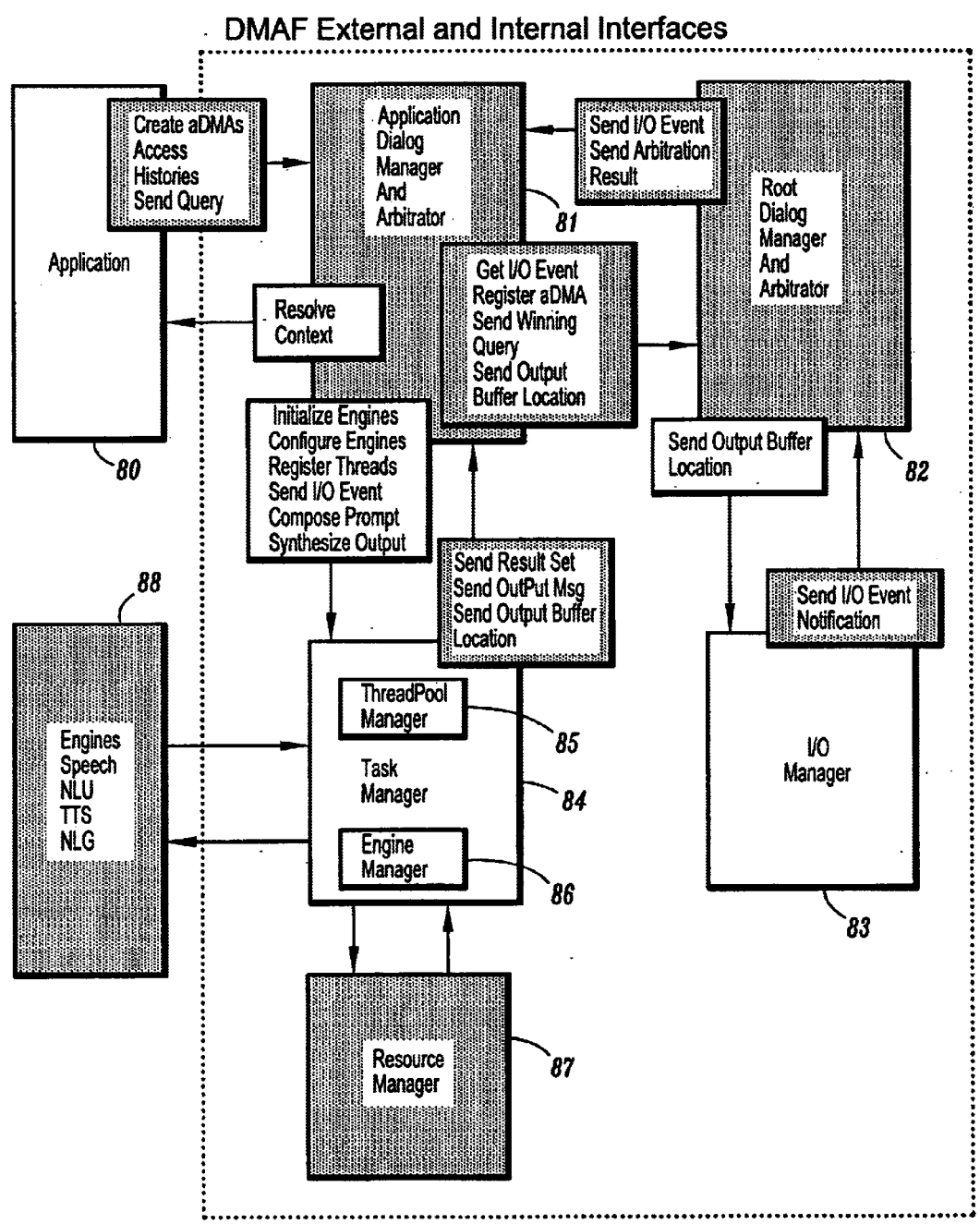
FIG. 6 is a diagram illustrating a conversational computing system employing a DMA according to an embodiment of the present invention.

The DMAF operates in conjunction with other components of a CVM. Referring now to FIG. 6, a block diagram illustrates a system for providing conversational computing according to an embodiment of the present invention. More specifically, the embodiment of FIG. 6 illustrates the interfaces between DMAF and other CAF components. The system comprises a conversational application 80, an application DMA 81, a root DMA 82, I/O manager 83, a task manager 84 comprising a ThreadPool manager 85 and Engine Manager 86, a Resource manager 87 and a plurality of conversational engines 88. The application DMA 81 and root DMA 82 and related interfaces comprise the DMAF. The DMAF provides an interface between the conversational application 80 and the other CAF components 83, 84, 85, 86, 87 and 88.

The I/O manager 83 is the CAF component that interfaces with all input and output devices. Through an internal interface with the DMAF, the I/O manager 83 sends input notification events to the rDMA 82 and presents to users the output requests sent through the rDMA 82. More specifically, I/O manager 83 performs the following functions: (i) sends user input notification events to the rDMA; (ii) receives output notification requests from the rDMA; (iii) receives acknowledgments from the rDMA when children consume input; and (iv) transmits acknowledgments to the rDMA after output is presented. Thus, from the rDMA point of view, the interaction with the I/O manager requires a method to receive input notification events and a method to send output generation requests. Preferred embodiments and protocols for providing I/O management in accordance with the present invention are described in further detail below.

Furthermore, the DMAF communicates with the Task Manager 84, which is the CAF component that interfaces with the engines 88 (e.g., ASR, NL, etc.) via engine APIs. The Task manager processes commands from the application DMA 81 to, e.g., initialize and configure the engines 88, register threads, compose prompts, synthesize output, etc. The Task manager 88 comprises two components—a ThreadPool manager 85 and an Engine manager 86. The ThreadPool manager 85 is responsible for tracking threads created by the platform. In the context of the DMAF, the ThreadPool manager 85 manages the main application thread (associated with the application DMA 81) that is created when the application 80 is launched, as well as all threads created when children aDMAs are created to manage sub-dialogs of the application 80. The Engine Manager 86 acts as the primary interface with the engine APIs. The Engine Manager 86 collaborates with a Resource manager 87, which is another component of CVM. Although the Resource manager 87 manages all the resources on the platform, in a preferred embodiment, the resource manager does not interact directly with the DMAF: it only designates resources that the task manager will access.

The role of the Task Manager 84 comprises the following: (i) receiving user input notification events from aDMAs; (ii) sending engine results (e.g. NLU feature value pairs, NLU parse tree, free text etc.) to aDMAs; (iii) receiving output request generation from aDMAs; (iv) sending output results (e.g. prompts) to aDMAs; and (v) managing threads through the ThreadPool manager. When a DMA creates a new thread, the thread registers itself with the ThreadPool Manager 85. The ThreadPool manager 85 manages all threads created by the CVM components.

In a preferred embodiment, an XML-based encoding scheme is employed by the Task manager 84 to exchange information between the engines 88 and the dialog management framework. It is to be appreciated that a preferred XML-encoding defines a simple dialect of XML that is extensible to enable the addition of new items of information as they become necessary. Having the dialog management framework and engines communicate by means of an XML stream also makes this architecture automatically distributable, wherein the dialog management framework and engines view one another as the producer/consumer of an XML-encoded stream. Control exchanges can be exchanged in XML-encoding (e.g. an XML protocol such as SOAP), possibly sometimes synchronized with incoming or outgoing audio or multimedia streams using the mechanisms described, for example, in International Application No. PCT/US99/22925, filed on Oct. 1, 1999, entitled "*System and Method For Providing Network Coordinated Conversational Services,*", as well as the mechanisms described in U.S. application Ser. No. 09/703,574, filed on Nov. 1, 2000, entitled "Conversational Networking Via Transport, Coding and Control Conversational Protocols", both of which are commonly assigned and incorporated herein by reference. U.S. Ser. No. 09/703,574 describes a novel real time streaming protocol (which is an extension of RTP (real time protocol)) that provides for real time exchange of, e.g., control information between distributed devices/applications.

DMA Interfaces with Conversational Application

The following discussion describes various interfaces that the DMAF exposes to the conversational developers. These interfaces provide the complete interaction with the DMAF (and thus with CVM) from the point of view of an application developer.

In a preferred embodiment, a conversational shell application (or "CVMshell") is implemented using the DMAF so as to provide access to the CVM platform. The CVMshell application is instantiated when CVM is installed on a given platform. The CVMshell is preferably the first application the platform will host.

The CVMshell is a specialized application that provides a plurality of preferred functionalities. For example, the shell application instantiates all CVM components. The CVMshell provides an "install interface" that application developers will have to implement to install their conversational applications on the CVM platform. The CVMshell provides a simple command line interpreter through which application developers can downloaded their applications onto CVM either locally or remotely. In addition, the CVMshell provides an interface that allows a user to run applications on the platform via command line GUI and/or and speech commands.

Furthermore, the CVMshell comprises a plurality of methods to instantiate components such as an rDMA, I/O Manager, Task manager (which, in turn, will instantiate ThreadPool Manager and Engine Manager modules), and a Resource Manager. Preferably, a factory of classes are provided to create instances of all these classes.

The CVMshell provides functions such as instantiating a shell property class and populating it with all resources of the shell, data files and algorithm string. Further, the CVMshell creates a command registry. The command registry table is empty when no applications are installed on CVM, but the command registry is eventually populated by the list of commands to launch a given application, as well as the corresponding entry points to the application. Further, the CVMshell creates a new aDMA object and sends the property class of the shell to its constructor (which will add the aDMA and task Manager as listeners on that class).

When the CVMShell initializes, all the objects will be instantiated. The CVMShell further comprises static methods that return handles to these objects.

The "Install Interface" provided by the CVMshell is an interface that allows an application developer to install applications on the platform. The install interface preferably provides methods for: (i) specifying an application name and a class that implements the application name; (ii) generating a list of commands that can be used to launch the application; (iii) generating a list of call back functions to launch when these commands are understood by the engines; and (iv) specifying the manner(s) by which an application may be launched (GUI, command line, etc.)

When the install program runs, the command registry of the CVMShell will be populated by the call back functions and commands provided by the application. Each time a new application is installed, the command registry will be augmented with new commands and call back functions. It is to be understood that if two applications use one or more identical launch commands, the install interface will warn the second application that the command(s) chosen will override the launch command(s) of a previous application.

The DMAF further implements a plurality of methods for to enable interaction with conversational Applications. More specifically, the DMAF preferably implements methods that are made accessible to applications and that are used to implement the following functions: (i) creating DMAs and passing such DMAs application properties such as grammars, language models, algorithm strings for input and output processing specification (which are passed to the Task manager); (ii) populating command registries (that are used in the DMA) that comprise the callback functions and the associated queries; (iii) specifying dialog state exit condition (s) (which are used in the DMA); (iv) storing and retrieving transaction records in the DMA (again, these records may help in undo, repeat or summarization actions (if supported by application), and the grouping of events that form each transaction is at the discretion of the application developer); and (v) accessing DMAs histories to help in context resolution.

In addition, the conversational applications implement a plurality of methods that allow interaction with the DMAF. In a preferred embodiment, the DMAF expects the application developers to implement, at a minimum, one or more methods so that the DMAF can communicate with the application. For example, in one embodiment, conversational applications implement appropriate methods to perform context resolution. In such an embodiment, the DMAF does not impose any specific protocol for context resolution, but the DMAF does impose the arguments to the method and the return type. For example, in a preferred embodiment, a contextResolver method accepts an NLResult object and returns a Query object.

DMA Information Flow

The following describes the information flow inside the DMA once a user input is captured and transmitted to the rDMA. Before describing the information flow, the following is a list of preferred internal classes defined by the DMA defines and their usage.

Input Notification Event Class: Input notification events are created by the I/O manager and sent to the rDMA Command Registry Class.

Command Registry Class: Creates a table to store queries and their associated callback functions.

Registration Table Class: Creates a table to store DMA and reference to applications/sub-dialogs they are managing.

Input Queue Class: Creates a queue in which input notification events are inserted. Each aDMA comprises an input queue class, in which input event notifications are stored. Upon receipt of an input notification event from its parent, the aDMA will insert the input notification event into the input queue of all its children so that the children can begin processing the user input.

This notification occurs recursively in a top down fashion until all DMAs have been notified of the user input event.

NLU Result Class: Stores NL results, confidence value, and other data associated with a NLU process.

Query Class: stores the results of context resolution.

Query Hashtable Class: A hashtable in which queries are inserted. This is a hashtable keyed by the DMAs. To each DMA (key) is associated the query (value) that resulted from context resolution. This hashtable represents the result queue of the DMAs.

Short Term History (STH) Class: Creates a stack in which events pertaining to a single user inputs are stored.

Long Term History (LTH) Class: Creates a stack in which events pertaining to a particular task are stored.

Transaction History (TRH) Class: Creates a stack in which transaction objects are stored. These objects group events at a semantic level defined by the application developer.

Focus History (FH) Class: Creates a stack in which the current focus is tracked.

FIGS. 7A–7D comprise a flow diagram that illustrates a method for providing dialog management and arbitration in accordance with one aspect of the present invention. In particular, FIGS. 7A–7D illustrate the flow of information within the DMA and describes how the DMA handles user input, passes it through the various components for processing, and returns symbolic representation of the user's intent to the application. The following algorithm further describes how the DMA manages the output response of the callback functions once the application returns the query back to the DMA.

Figure 7A:
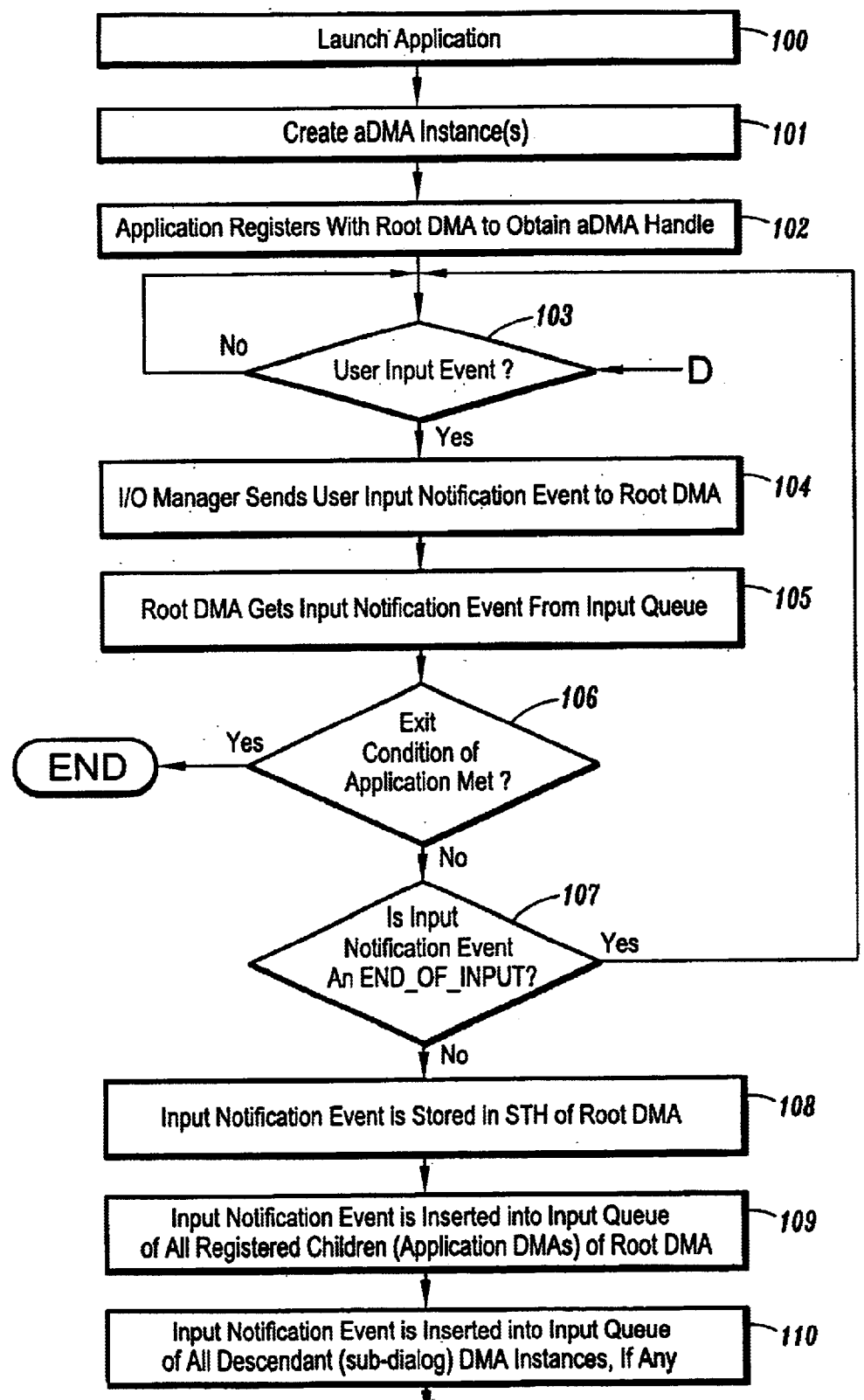
FIGS. 7A, 7B, 7C, and 7D comprises a flow diagram of method for providing dialog management and arbitration according to one aspect of the present invention.

Referring now to FIG. 7a, a user will launch one or more conversational applications using the appropriate command via, e.g., speech or GUI (step 100). When an application is launched, one or more aDMa instances will be created for the application (step 101). As explained above, at least one aDMA instance (which is a child of the root DMA) will be generated by an application to manage the main dialog associated with the application. Further, depending on the manner in which an application is programmed, other aDMA instances (which are the children of the main aDMA) can be created to manage sub-dialogs. An application will register with the rDMA to obtain an aDMA handle for the aDMA instances created by the application (step 102). The rDMA maintains a list of all registered aDMAs, which registration allows an application to receive dialog management services from the rDMA. As explained above, a dialog manager and arbitrator architecture can support multiple applications. Thus, the following discussion assumes that one or more applications are active.

Once an application is initialized, the system will wait for a user input event, e.g., voice command or mouse click (step 103). When a user input event is received (affirmative result in step 103), the I/O manager will send a corresponding user input notification event to the rDMA (step 104). The rDMA will then retrieve the input notification event from its input queue (step 105). If the "exit" condition of a given application has not been met (negative determination in step 106) and if the input notification event is not an "END_OF_ INPUT" event (negative determination in step 107), the rDMA will store the input notification event in its STH (short term history) (step 108) and then insert the input notification event into the input queue of all registered children (109). In other words, in one embodiment, the rDMA will send the input notification event to each main aDMA that is registered with the rDMA. Using a top-down approach, each main aDMA will then insert the input notification event into the input queue of its descendant aDMA instances, if any, and this process is repeated down the hierarchical tree until all of the aDMA instance have received the input notification event (step 110).

It is to be understood that other methods may be employed to transmit the input notification events to aDMAs in the tree. Indeed, as noted above, because the rDMA preferably tracks which of the registered aDMAs is active, a pruning method may be employed wherein the user input is passed to only those registered aDMAs that have been active ("in focus") for a predetermined number of dialog turns. Those skilled in the art may envision other protocols for passing the user input to registered aDMAs.

Figure 7B:
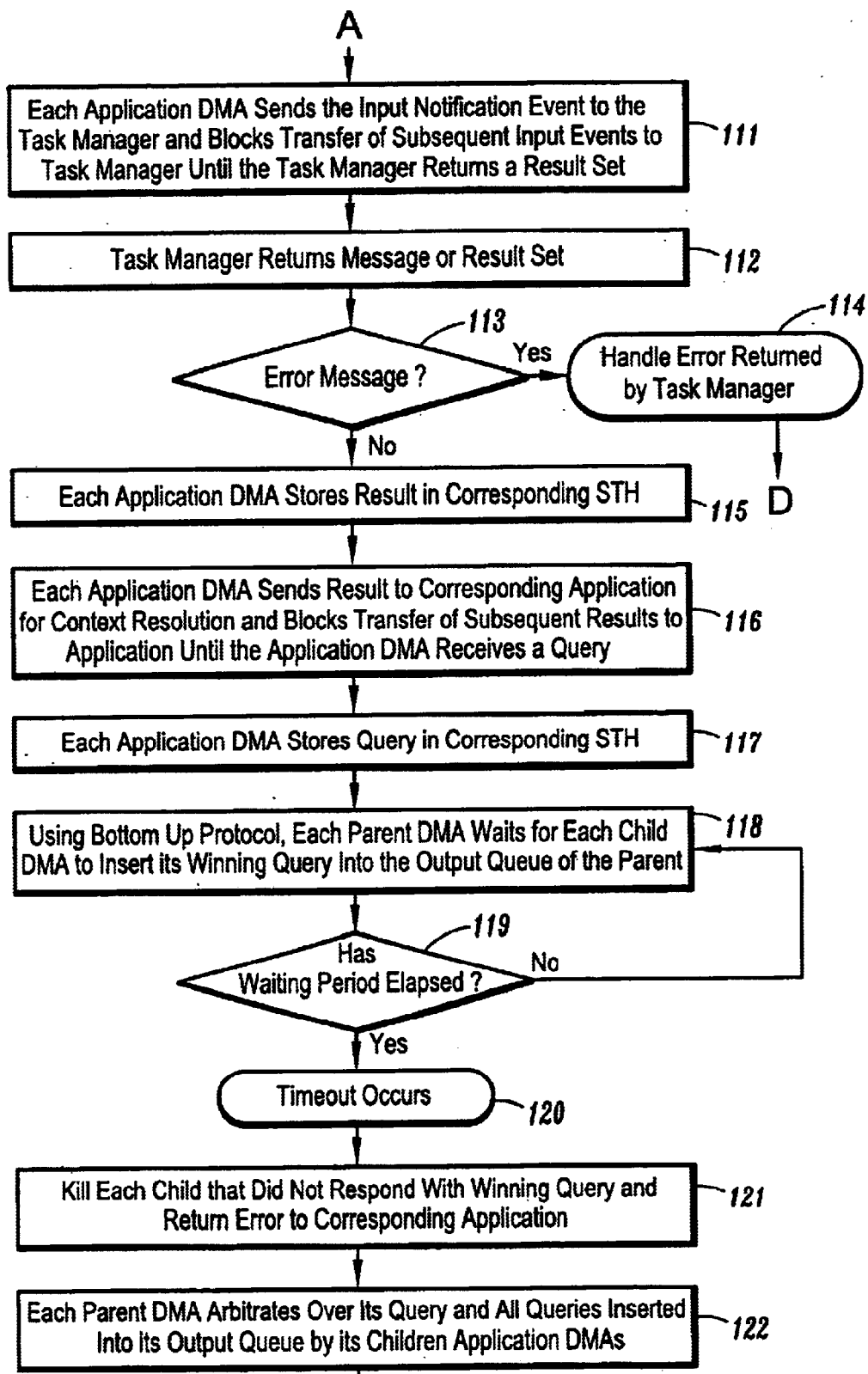

Referring now to FIG. 7B, each aDMA will send the input notification event to the Task Manager and block subsequent transmission of notification events to the Task Manager until a response is received for the current notification event (step 111). The Task Manager will then return a message or result set (e.g., a speech recognition result and NLU result) to each aDMA from which the Task Manager received the user input notification event (step 112). If an error message is returned (affirmative result in step 113), the error will be handled accordingly (step 114). For example, if an error message is returned from the Task Manager, the aDMA will inform the application of the error. Errors can be assigned different severities and the aDMA may, depending on the severity, decide to ignore the error, inform the application of the error and move on to next user input (e.g., return to step 103), or if the severity if high, then exit the application. The application may also provide mechanisms to handle the error or rely on platform services (CVM) or other applications to handle the error and offer an error recovery mechanism or an error handling dialog. These may be application specific or generic.

On the other hand, if a result set is returned (negative result in step 113), each aDMA will store the result in its corresponding STH (step 115). This result set comprises a symbolic representation of the user's intent which is generated by the engines. Each aDMA will send the results to its corresponding application for context resolution and block the transfer of subsequent results to the application until a query is returned for the current result set (step 116).

An application will perform context resolution on the result received by the associated aDMA(s) to generate a query (i.e., an interpretation of the user intent). It is to be understood that the process of context resolution differs between different applications and within the same application for different sub-dialogs. Thus, the result of context resolution (i.e., query) received by each aDMA will be different. Further, during the process of context resolution, an application can collaborate with an aDMA to obtain additional information that is maintained by the aDMA such as a command returned by NLU, transaction history, current context, etc., to disambiguate the query.

After context resolution, an application will return a resulting query to each aDMA. Each aDMA will store a query received by an application in its STH (step 116). As mentioned earlier, the functions of dialog management, user intention understanding and context resolution may also be provided by a module (application, CVM service) or even be also provided by each aDMA.

Next, using a bottom-up approach, arbitration is performed by each parent aDMA in the hierarchical tree using any methodology. In a preferred embodiment, a suitable heuristic algorithm is utilized to determine a "winning query" (i.e., a top-scoring query result). In particular, starting from the lowest level in the tree structure, each parent aDMA will wait for each of its children aDMAs to insert their "winning" queries into the output queue of the parent (step 118). Note that the children aDMAs at the bottom of each branch in the tree will not perform arbitration because they are not parents (i.e., they simply provide their queries (received from the application) to their parent).

Preferably, an alarm manager is employed to trigger a timeout after a predetermined period of time so that a parent aDMA does not wait indefinitely for receiving a winning query from each child. Thus, if the predetermined waiting period expires (affirmative result in step 119), a timeout will occur (step 120). Then, the parent will kill (disregard) each child aDMA that did not respond with a winning query within the predetermined time period and send an error message to the associated application (step 121). It is to be appreciated that in another embodiment, the time out can be extended if a child requests a timeout extension from its parent on a particularly complex processing task.

Figure 7C:
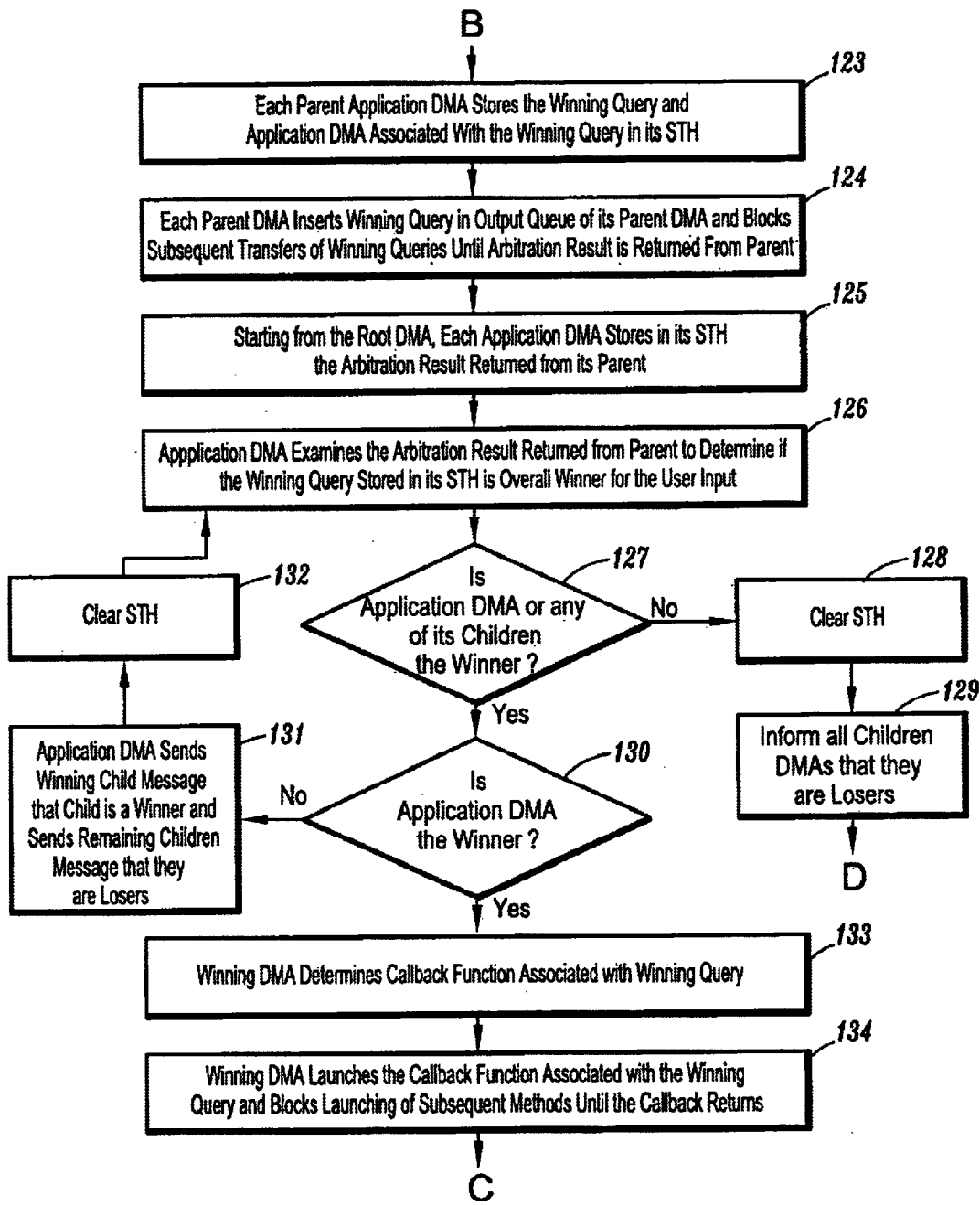

A parent aDMA will then arbitrate over the query that the parent received from the application and all the winning queries in its output queue (received by its children during the waiting period) to determine a winning query at the level of the parent (step 122). Referring to FIG. 7C, the parent will then store in its STH the winning query together with an identification of the associated aDMA (step 123). Next, the parent (which is a child of another parent aDMA) will insert the winning query in the output queue of its parent aDMA and block subsequent transfers of winning queries to the parent until the aDMA receives an associated arbitration result from the parent (step 124).

This arbitration process (steps 118–124) is performed from the bottom to the top of the hierarchical DMA tree, until the root DMA receives the winning queries from its children aDMAs. The root DMA will then arbitrate between all winning queries received by its children (within the predetermined waiting period) to determine the overall winning query. The rDMA will generate a final arbitration result that comprises the overall winning query and the child aDMA from which the overall winning query was received.

Then, using a top-down approach, the final arbitration result is transmitted down the hierarchical DMA tree. In particular, the root DMA will send the final arbitration result to each of its registered children aDMAs and each aDMA will store the arbitration result in its STH (step 125). Each parent aDMA will examine the arbitration result returned from its parent to determine if the overall winning query for the user input (associated with the returned arbitration result) matches the winning query that was previously determined via arbitration by the parent aDMA and stored (in step 123) in its STH (step 126).

If, based on the returned arbitration result, a parent aDMA determines that neither it nor any of its children aDMAs is the winner (negative determination in step 127), then the parent aDMA will clear its STH (step 128) and then inform all of its children aDMAs that they are losers (step 129). If, on the other hand, a parent aDMA determines that the overall winning query is associated with an aDMA that is within the tree branch managed by the parent (affirmative determination in step 127), and that the parent is not the winner but rather one of its children is the winner (negative determination in step 130), then parent aDMA will send the winning child aDMA notification that it is the winner and send the remaining children notification that they are losers (step 131). The parent aDMA will then clear its STH (step 132).

When an aDMA determines that it is the winner (i.e., that it provided the overall winning query) (affirmative determination in step 130), the aDMA will use the command registry (which maps queries to callback functions) associated with the application to determine the callback function associated with the overall winning query (step 133). The winning aDMA will then launch the callback function and block the launching of subsequent callback functions until the current callback returns (step 134).

Figure 7D:
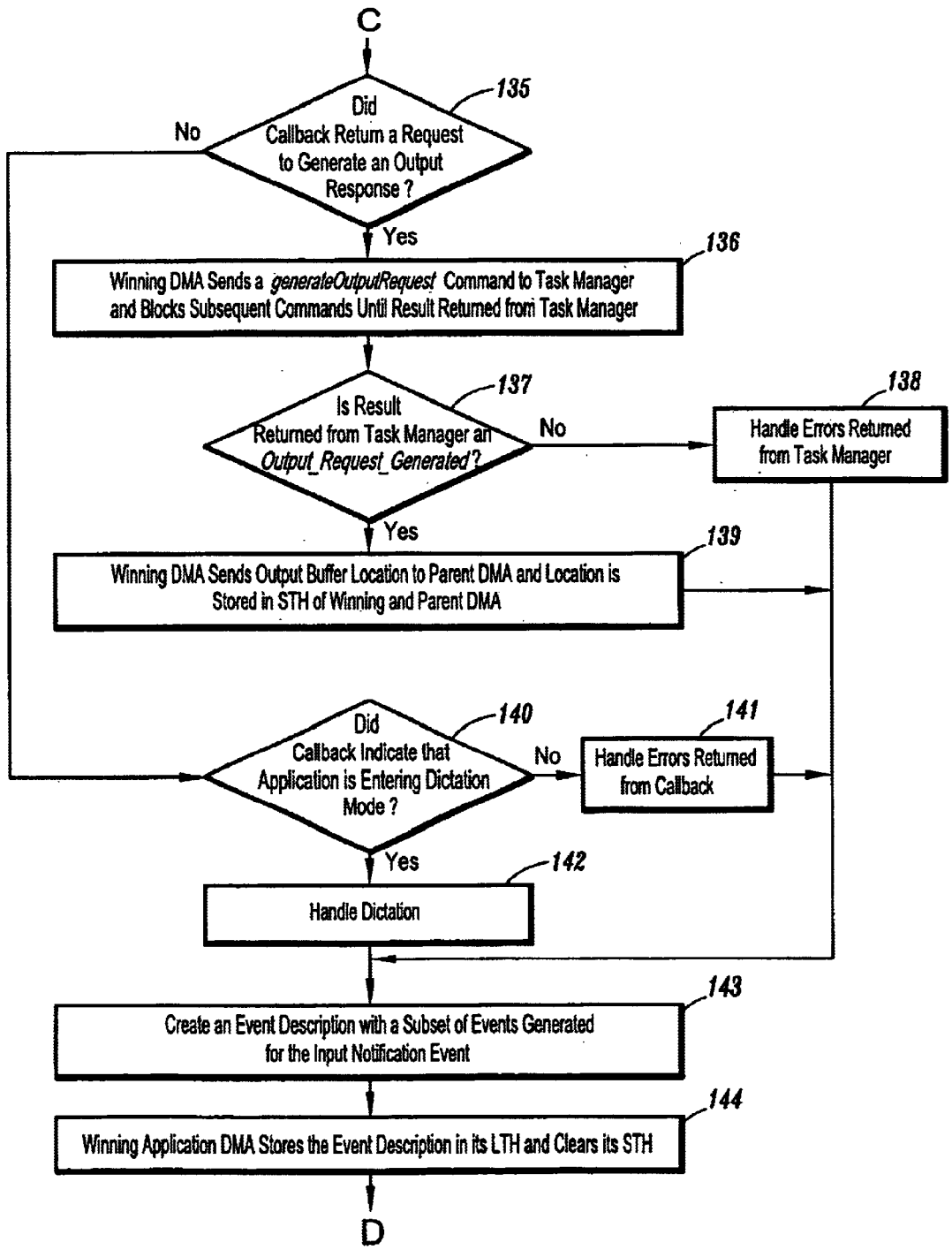

Referring now to FIG. 7D, if the callback returns a request to generate an output response (affirmative result in step 135), the aDMA will send a generateOutputRequest to the Task Manager and block the transmission of further requests until the Task Manager returns the results of the current request (step 136). If the Task Manager returns a result that is not an "OUTPUT_REQUEST_GENERATED" message (negative result in step 137), the error is handled accordingly (step 138), e.g., as described earlier with input processing errors. If, on the other hand, the Task Manager returns an "OUTPUT_REQUEST_GENERATED" message (affirmative result in step 137), the winning aDMA will send the location of the output buffer to its parent aDMA which stores it in STH (step 139). The output buffer location is then transmitted up the tree to the root DMA which then sends the output buffer location to the I/O manager.

If the callback returned indicates that the application (associated with the winning aDMA) is entering dictation mode, a dictation process will be handled accordingly. The process of dictation varies depending on the manner in which the application is programmed. As noted above, preferably, the aDMAs of the application will send notification up the DMA tree to inform the root DMA to send all user input notification to the winning aDMA only. In addition, the application preferably provides a mechanism to terminate the dictation and resume input notification to all DMAs.

After the callback return is processed (steps 139 or 142) or after errors are handled (steps 138 or 141), an event description is generated comprising a description of the subset of events associated with the input notification event (step 143). As noted above, the subset of events comprise, e.g., the I/O input notification event, the query object, and the response by the parent. When a task has been completed and a new state in the dialog begins, the subset of events in the STH of the winning aDMA will be pushed into its long term history (LTH). The subset of events can be grouped in a descriptor object, which is then tagged with the I/O transaction ID and pushed onto LTH of the aDMA, which then clears its STH (step 144). This DMA process is repeated for next successive user inputs (return to step 103, FIG. 7A).

I/O Management

Preferred embodiments of the I/O manager and the interaction protocol with the rDMA will now be described in detail. It is to be appreciated that in one embodiment of the present invention, I/O is addressed by the application developer and the CAF only controls engine access and arbitration.

In another embodiment, I/O manager is a component of the CVM (CAF), thereby shielding application developers from having to know the details of the devices/peripherals that can be utilized to interact with the conversational applications. Preferably, an I/O manager according to the present invention is constructed based on various considerations such as:

1. Ease of authoring: An application developer that writes an application against the CAF should be provided with a mechanism to hook various modalities of the application to the CAF. In one embodiment, the CAF may comprise an input/output manager for all modalities. In another embodiment, a common set of elements (such as focus updates, text field values, etc.) and a common interchange language can be provided such that the CAF can extract (from any modality manager) all the information needed for it to accomplish the tasks it is designed for (i.e. arbitration, events storage etc.);

2. Arbitration: Ambiguous user input (e.g., speech, gaze, etc.) should be passed through the rDMA hierarchy for arbitration. User input modalities that are not ambiguous by nature (e.g., GUI, Pen, etc.) do not typically require arbitration because the field to which the user input is intended is known a priori;

3. Recording User Interaction and all I/O events: Preferably, recording user interaction and I/O events is performed for all modalities, and is accessible to all applications irrespective of the modality of the user input and output;

4. Access To Underlying Engines: For modalities in which user input (as well as output generation) requires access to engines (such as speech recognition, pen recognition, TTS, etc.), a mechanism for sending user input (or output events) to the appropriate engine(s) is needed;

5. Synchronization: Preferably, a mechanism is provided to allows the use of multiple modalities in a complementary fashion. By way of example, a user may move the mouse to a window and utter something to fill a text field. Thus, input events passing through the CAF need to be time stamped (and origin stamped) and reactions synchronized;

6. Extensibility: A CAF according to the present invention comprises an extensible framework. Thus, CAF (an particularly I/O management) preferably allows new modalities to be readily incorporated into the framework; and 7. Distributable: CAF components (e.g., I/O manager) can be distributed. Thus, the I/O manager should be capable of handling user interaction that emanates from various sources and/or from various domains and networks, as well as sending output events to different devices or modalities.

Generally, a multi-modal I/O manager according to an embodiment of the present invention acts on user inputs to abstract them, independently of the input modality and transmits these abstract input events for further processing by the CAF DMAF or other CAF components (or other applications that may not be related to CAF). As explained above, an input event can be tagged by its origin to decide the nature of the processing to perform on the event (e.g., should the event be disambiguated or not, etc.). In addition, the I/O manager can receive abstract output events from the CAF DMAF, other CAF components, or other applications that may not be related to a CAF. The I/O manager converts the abstract output events into commands that are understandable and executable by one or more different channels (device, modality etc.), and then sends the converted abstract events to the appropriate channels.

Figure 8:
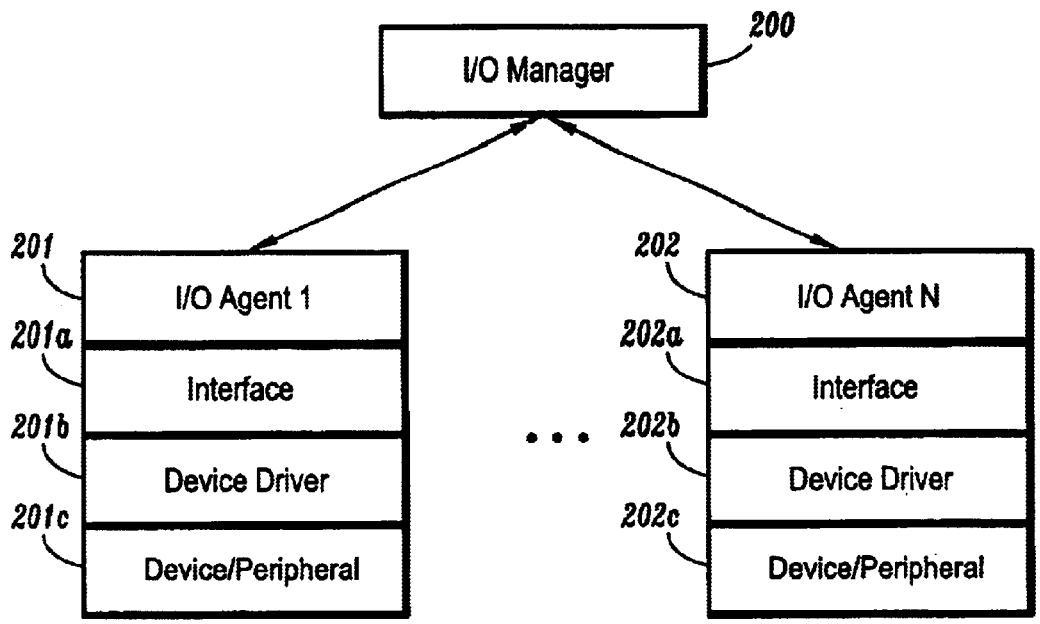
FIG. 8 is a block diagram of a system and method for providing multi-modal input/output management according to an embodiment of the present invention.

FIG. 8 illustrates a system and method for providing multi-modal I/O management according to an embodiment of the present invention. A multi-modal I/O manager comprises a central I/O manager 200 and a plurality of I/O agents 201, 202 (or "modality agents") that operatively communicate with the central I/O manager 200. It is to be understood that two I/O agents are shown for illustrative purposes and that a multi-modal I/O manager may comprise more than two I/O agents. The central I/O manager 200 acts as an intermediary between the various modality I/O agents 201, 202, and the CAF. Each I/O agent 201, 202 implements both an interface to the central I/O manager 200 and an interface of the specific device it is supporting. Each I/O agent handles a particular modality and is responsible for gathering events from the modality via the APIs that the modality understands.

More specifically, each I/O agent 201, 202 comprises an interface to communicate with the central manager 200 as well as an interface 201a, 202a (e.g., Accessibility API for GUI, DOM for a browser, telephony API for telephone speech, etc.) to communicate with the respective device driver 201b, 202b. Each device 201c, 202c comprises an associated I/O agent 201, 202 that registers with and communicates with the central I/O manager 200 using a common messaging protocol. The central I/O manager 200 handles all communication with other CVM components, thus shielding the CVM platform from device dependent information.

Preferably, each modality agent is capable, at a minimum, of sending focus updates (if they are available) to the central I/O Manager 200. All other events that may be sent are preferably left to the discretion of either the modality agent, or the application developer. This is analogous to sending ID tags associated to each event. Other mechanisms may be used in addition to ID tags, such as IP addressed or other addresses for sockets of the devices or URI etc. Further, output events sent by the CAF to the central I/O manager 200 comprise a destination address (e.g., a focus or a ID tag).

Preferably, a common interchange protocol is employed for communication between the modality agents and the central I/O manager 200, which allows each modality agent to preferably transmit: (i) Focus Updates; (ii) Input Notification Events (and associated information, such as stream location, etc.); (iii) Events that have been wrapped in a CAF history Record to be stored on the DMA's stack; and (iv) Output Notification/control (and associated information, such as stream location, etc.)

Each I/O agent 201, 202 registers with the central I/O manager 200. During communication, an I/O agent sending an input event to the central manager 200 can inform the central I/O manager 200 that the input event requires engine support, specifying how to extract data out of the input stream. Further, an I/O agent receiving an output event can request engine support, specifying how the output data should be provided. Further, an I/O agent can request arbitration for an input event (as is the case with speech), so that the central I/O manager sends input notification events through rDMA hierarchy for arbitration. Further, an I/O agent can specify that the input/output is to be placed in history in which case the central I/O manager 200 can either inform an associated rDMA with a special message or directly contact the DMA responsible for the application. Further, for focus updates, the central I/O manager 200 sends a special notification to rDMA to update focus and transmit to appropriate DMA.

Preferably, all events sent to the central I/O manager 200 are time stamped so that synchronization between events from multiple modalities can be achieved. The central I/O manager 200 communicates with the rDMA and receives messages from various I/O agents. When a new modalities need to be supported, a modality agent needs to be written for that modality, and then register itself with the CAFs input/output manager.

Further, the I/O agents can be local or distributed across a network. When distributed, numerous protocols can be used to support communication and registration. For example, an XML protocol stack may be implemented herein (e.g., SOAP (Simple Object Access Protocol), UDDI (Universal Description, Discovery, and Integration), WSDL (Web Services Description Language), etc.) (see http://www.w3.org/2000/xp/, for example). Further, the communication protocols as described in the above-mentioned International Application No. PCT/US99/22925 can be implemented to provide communication and registration between local and remote applications.

Figure 9:
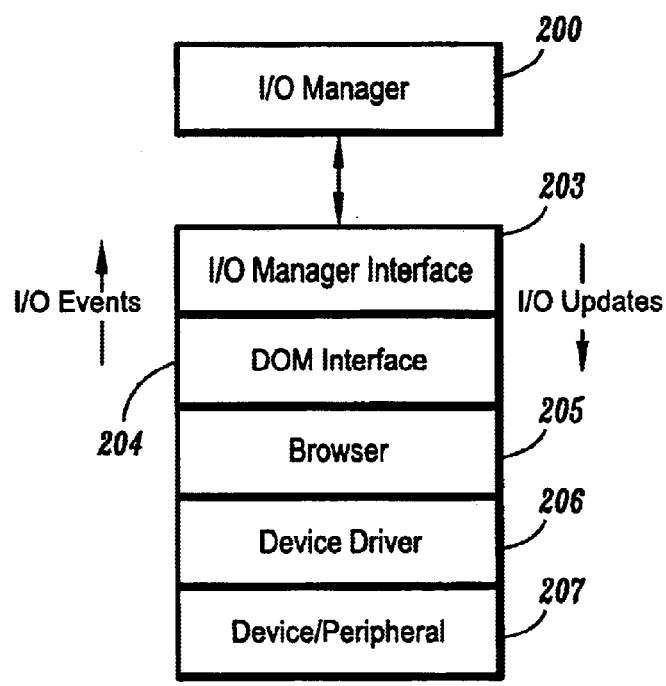
FIG. 9 is a block diagram of an input/output agent of a multi-modal input/output manager according to an embodiment of the present invention.

Various embodiments of an I/O agent according to the present invention may be implemented herein. For instance, FIG. 9 is a block diagram of an I/O agent according to an embodiment of the present invention. In the exemplary embodiment of FIG. 9, an I/O agent is implemented using existing browsers that expose a DOM (document object model) (at least level 2) interface. The DOM protocol is known in the art (http://www.w3.org/DOM/). A preferred embodiment of a modular DOM-based multi-modal browser which may be implemented herein in disclosed in U.S. Provisional Patent Application Ser. No. 60/251,085, filed Dec. 4, 2000, which is commonly assigned and incorporated herein by reference.

More specifically, through an I/O manager interface 203 and DOM interface 204, an I/O manager 200 receives I/O events associated to a registered browser 205 that acts as an I/O agent. The I/O manager 200 can modify and produce outputs through DOM commands that update the state and presentation of the browser 205. This approach provides an advantage in that existing browsers (provided that they are at least DOM Level 2 compliant) can be implemented. The browser 205 also provides a higher level interface with the associated I/O device driver 206 and corresponding peripheral 207. The browser 205 may also provide a higher level of abstraction, including the capability to readily preprocess the input and output. For example, a voice browser could perform some level of speech recognition and only pass to the I/O manager events at a higher level of abstraction. Accordingly, the output commands can also be produced at a higher level of abstraction, whereby, for example the text-to-display or prompt is provided instead of actually painting the screen or window or finely controlling the text-to speech engine.

Assuming the I/O agent comprises a GUI modality agent, the I/O agent preferably maintains a registration table per application, wherein the registration table comprises each component that the application wants to register with the CAF. For each component in the registration table, the GUI agent preferably uses the accessibility interface to capture the events needed. The application components of the developer will implement the accessibility interface.

Assuming the I/O agent comprises a multi-modal browser, the browser modality agent is preferably implemented as a module that uses the DOM interface to listen for certain events and then, in turn, notify the input manager when such events occur. In the case of the Multi-modal browser, a CAF is not required when the browser does not support free flow dialog. In such an embodiment, the multi-modal I/O manager is operatively connected between legacy modality-specific browsers and a multi-modal shell. When the CAF is employed, the multi-modal I/O manager can be operatively connected to the multi-modal shell or to the DMAF.

When the I/O agent is implemented for telephony applications, a telephony modality I/O agent interfaces with an existent telephony API.

Further, a VoiceXML DOM browser can be built from a conventional VoiceXML browser by exploiting the same concept of I/O manager where the manager provides the DOM interface and the conventional VoiceXML browser is the Voice agent.

It is to be understood that the embodiments discussed above using browsers can be implemented declaratively, imperatively, using scripts or any hybrid combination thereof. For example, consider an imperative case using Java, wherein the applications or applets are complied with the Java accessibility classes/utilities (see, e.g., http://java.sun.com/products/jfc/#download-access) that are well known in the art. As in the case of the DOM interface, the Java Accessibility Utilities package provides support assistive technologies to locate and query user interface objects inside a Java application running in a Java Virtual Machine. It also supports installation of "event listeners" into these objects. The utilities provide example tools that highlight how to enable assistive technologies to interact with the Accessibility API support built into Swing components. By capturing events and manipulating the user interface elements, it is possible to perform the same kind of I/O management. Other packages such as ActiveX and DCOM that provide similar utilities may also be utilized.

Any other interfaces (DOM or accessibility) can be extended to new channel types (e.g. voice, handwriting, etc.). Other interfaces or utilities that provide similar functionality or capability can be considered. When distributed, remote control of the DOM (or DOM equivalent) can be implemented by SOAP. SOAP affords an advantage in that program calls are much more likely to pass through firewalls and gateways. Of course, any other protocol that allows remote control of these interfaces can be used.

Other Applications

Figure 10:
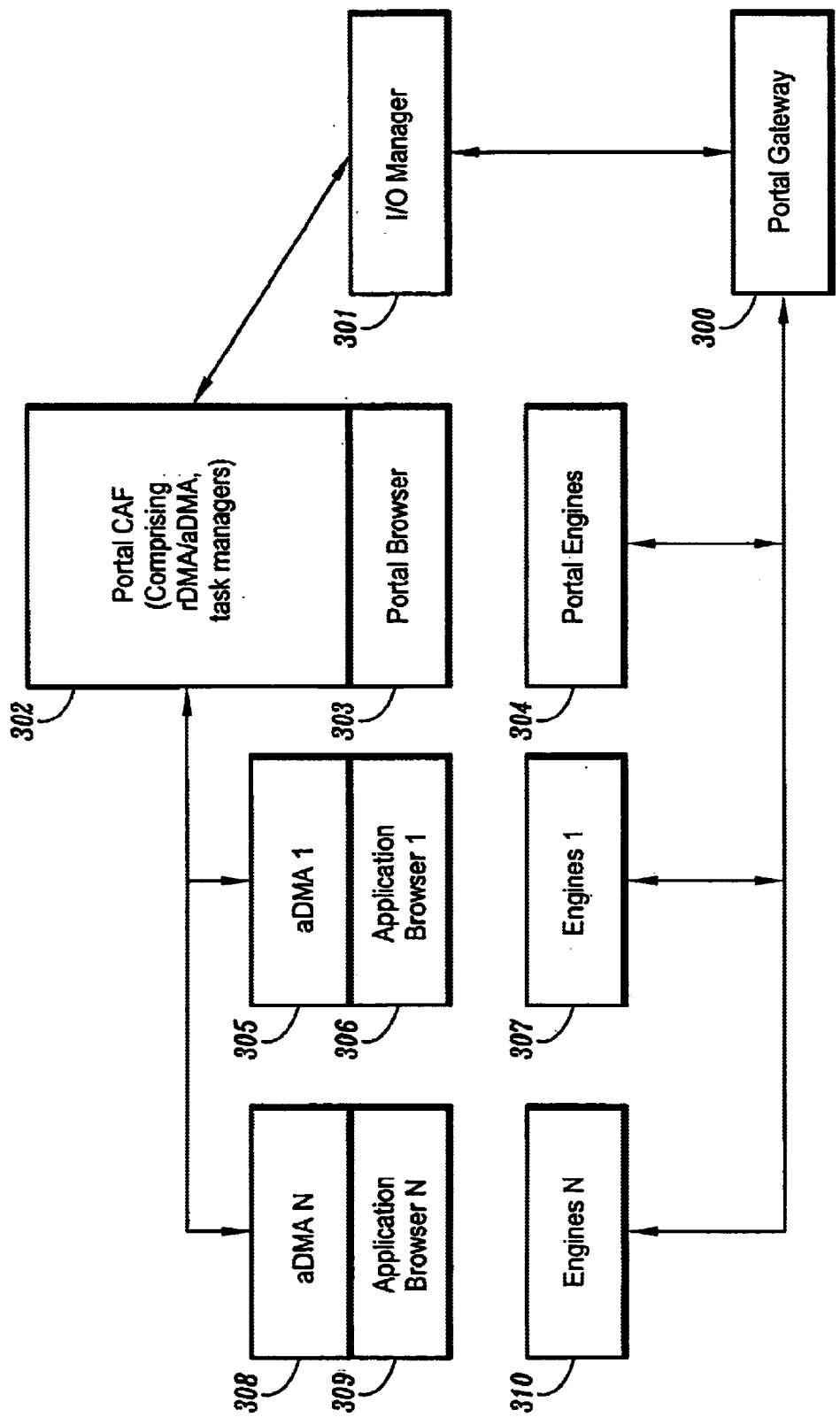
FIG. 10 is a block diagram of a voice portal according to an embodiment of the present invention.

It should be understood that other embodiments can be implemented in various manners utilizing all or a portion of the features and mechanisms described herein. For example, consider a Voice or Conversational Portal such as the portal described U.S. patent application Ser. No. 09/545,078, filed on Apr. 7, 2000, entitled "A Conversational Portal For Providing Conversational Browsing and Multimedia Broadcast on Demand". A voice or conversational portal according to an embodiment of the present invention is illustrated in FIG. 10. The Voice portal is access through a Portal gateway 300. The portal comprises a central I/O manager 301, a portal CAF 302 (which includes CAF components such as an rDMA and task manager), a portal browser 303, and a plurality of applications each employing an associated aDMA 305, 308 and Browser 306, 309. A plurality of engines 304, 307, 310 are employed for providing conversational services associated with the corresponding application.

The portal comprises a browser for each application that a user wants to interact with. Access to a portal application may be based on a phone number (preferred number to access the application when offered through the portal), or a URL (intercepted by the gateway 300 of the ISP or Wireless (conversational, Multi-channel or multi-modal) access provider. The user may interact with the different applications offered by the portal based on, e.g., a list of applications subscribed by the user, user preference or user past history, or simply the result of the evolution of the interaction of the user with the Portal. It is to be understood that the different applications and corresponding browsers can be located at the site of the application provider rather than being provided by the portal on the portal site.

Each browser is either operatively connected to or encompasses an aDMA 305, 308 when the application browsers 306, 309 support context management and free flow/mixed initiative. An arbitration algorithm (e.g. heuristics) and the aDMA function can be simplified when the browser only provides support for grammar-based dialogs (e.g. as supported current by VoiceXML 1.0 (http://www.voiceXML.org)). Accordingly, the recipient of a user input can be determined with high probability based on the recognized text and based on which grammar scores high. Some heuristics should be used when grammars overlap (e.g., which application had the current focus, etc.). GUI channels (and, in general, channels that do not require separate processing because the focus is unambiguous) also can be directly arbitrated—where the user clicks is where the focus most probably is. When the input is ambiguous, the portal provider can utilize the portal rDMA 302 and possibly provide high level services through the portal browser 303 and the aDMA of the portal CAF 302.

In another embodiment, switches between applications are constrained so that the user must explicitly instruct the browser of such a switch (e.g. by giving an explicit switch to the other application commands). This command would be managed by the portal aDMA and its associated application that recognizes such instruction. For instance, such command can be a particular command or keyword: go to financeXXX, or travelXXX site. This mechanism is essentially analogous to the mechanism for entering dictation mode within a given application as described above.

Eventually, for security reasons, the portal, user and application provider may decide to accept or refuse sharing of user I/O (incoming utterance, output utterance) and context (short term and long term history) between supported applications as described above.

In the exemplary embodiment, the audio (and other possible multi-modal or multi-modal events) can be shipped to each "active" browser (all or only the one, currently sharing the processing) using suitable conversational transport protocols such as those described in U.S. Ser. No. 09/703,574.

It is to be understood that the systems and methods described herein may be implemented in various forms of hardware, software, firmware, special purpose processors, or a combination thereof. In particular, the present invention is preferably implemented as an application comprising program instructions that are tangibly embodied on a program storage device (e.g., magnetic floppy disk, RAM, ROM, CD ROM, etc.) and executable by any device or machine comprising suitable architecture. It is to be further understood that, because some of the constituent system components and process steps depicted in the accompanying Figures are preferably implemented in software, the connections between system modules and the logic flow of the depicted methods may differ depending upon the manner in which the present invention is programmed. Given the teachings herein, one of ordinary skill in the related art will be able to contemplate these and similar implementations or configurations of the present invention.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for managing dialog of one or more applications, comprising the steps of:

instantiating a DMA (dialog manager and arbitrator) interface comprising a hierarchical tree structure comprising a root DMA and one or more application DMAs;

sending, by the root DMA, notification of a user input event to an application DMA;

obtaining, by the application DMA, a symbolic representation of the user input event;

calling, by the application DMA, an application method to perform context resolution of the symbolic representation;

receiving, by the application DMA, a query from the application, wherein the query comprises the results of the context resolution;

determining, by the DMA interface, if the application DMA is currently active based on the query received by the application DMA; and launching, by the application DMA, a callback function associated with the query, if the application DMA is determined to be currently active.

2. The method of claim 1, wherein the step of instantiating a DMA interface comprises registering, by an application, with the root DMA to obtain an application DMA handle.

3. The method of claim 2, wherein the step of registering comprises registering an algorithm string comprising a set and order of engines required by the application for processing user input.

4. The method of claim 1, wherein the step of instantiating a DMA interface comprises instantiating a main DMA to manage the main dialog of an application and instantiating a plurality of child instances of the main DMA to manage sub-dialogs of the application.

5. The method of claim 1, wherein the step of determining if the application DMA is currently active comprises the step of using a bottom-up arbitration protocol to determine if the query is a top-scoring query among all queries received by other application DMAs.

6. The method of claim 5, wherein arbitration is performed between friend applications based on security settings registered by the applications.

7. The method of claim 5, wherein the step of using a bottom-up arbitration protocol comprises:

arbitrating, by each parent application DMA in the hierarchical tree, between queries received from application DMAs that are children of the parent; and arbitrating, by the root DMA, between queries received from application DMAs that are children of the root DMA to determine if there is an overall winning query.

8. The method of claim 7, further comprising the steps of:

disregarding, by a parent DAM, a child DMA that does not provide a query within a predetermined time period; and extending the predetermined time period upon a request from a child DMA.

9. The method of claim 7, further comprising the steps of:

generating, by the root DMA, an arbitration result comprising the overall winning query and the associated application DMA; and sending, by each parent application DMA, notification of the arbitration result to each child application DMA.

10. The method of claim 1, wherein the step of launching the callback function comprises using a command registry to determine the callback function associated with the query.

11. The method of claim 1, wherein the symbolic representation comprises one of a speech recognition result, a natural language understanding result and a combination thereof.

12. The method of claim 1, further comprising the step of maintaining, by the DMA interface, a short term history comprising events associated with a user input event.

13. The method of claim 1, further comprising the step of maintaining, by the DMA interface, a long term history of events associated with an executed task.

14. The method of claim 1, further comprising the step of maintaining, by the DMA interface, a focus history that tracks active application DMAs during a dialog session.

15. The method of claim 1, further comprising the step of collaborating between an application and an application DMA to disambiguate an associated query.

16. The method of claim 15, further comprising the step of disambiguating a query using one of a short term history, long term history, focus history, and a combination thereof.

17. The method of claim 1, further comprising the step of generating a message in an appropriate modality, if a message must be presented to a user.

18. The method of claim 17, wherein the step of generating a message in an appropriate modality comprises converting, by a modality-specific I/O agent, a modality-independent output event to a modality-specific output event.

19. The method of claim 1, wherein if the callback function comprises a dictation mode, notifying the root DMA to send all input events to the application DMA.

20. The method of claim 19, further comprising the step of termination the dictation mode in response to a user input command.

21. A program storage device readable by a machine, tangibly embodying a program of instructions executable by the machine to perform method steps for managing dialog of one or more applications, the method steps comprising:
   instantiating a DMA (dialog manager and arbitrator) interface comprising a hierarchical tree structure comprising a root DMA and one or more application DMAs;
   sending, by the root DMA, notification of a user input event to an application DMA;
   obtaining, by the application DMA, a symbolic representation of the user input event;
   calling, by the application DMA, an application method to perform context resolution of the symbolic representation;
   receiving, by the application DMA, a query from the application, wherein the query comprises the results of the context resolution;
   determining, by the DMA interface, if the application DMA is currently active based on the query received by the application DMA; and
   launching, by the application DMA, a callback function associated with the query, if the application DMA is determined to be currently active.

22. The program storage device of claim 21, wherein the instructions for instantiating a DMA interface comprise instructions for registering, by an application, with the root DMA to obtain an application DMA handle.

23. The program storage device of claim 21, wherein the instructions for instantiating a DMA interface comprise instructions for instantiating a main DMA to manage the main dialog of an application and instantiating a plurality of child instances of the main DMA to manage sub-dialogs of the application.

24. The program storage device of claim 21, wherein the instructions for determining if the application DMA is currently active comprise instructions for utilizing a bottom-up arbitration protocol to determine if the query is a top-scoring query among all queries received by other application DMAs.

25. The program storage device of claim 24, wherein the instructions for using a bottom-up arbitration protocol comprise instructions for:
   arbitrating, by each parent application DMA in the hierarchical tree, between queries received from application DMAs that are children of the parent;
   arbitrating, by the root DMA, between queries received from application DMAs that are children of the root DMA to determine if there is an overall winning query.

26. The program storage device of claim 25, further comprising instruction for:
   generating, by the root DMA, an arbitration result comprising the overall winning query and the associated application DMA; and
   sending, by each parent application DMA, notification of the arbitration result to each child application DMA.

27. The program storage device of claim 21, wherein the instructions for launching the callback function comprise instructions for using a command registry to determine the callback function associated with the query.

28. The program storage device of claim 21, wherein the symbolic representation comprises one of a speech recognition result, a natural language understanding result and a combination thereof.

29. The program storage device of claim 21, further comprising instructions for maintaining, by the DMA interface, a short term history comprising events associated with a user input event during a state of the dialog.

30. The program storage device of claim 21, further comprising instructions for maintaining, by the DMA interface, a long term history of events associated with an executed task.

31. The program storage device of claim 21, further comprising instruction for maintaining, by the DMA interface, a focus history that tracks active application DMAs during a dialog session.

32. The program storage device of claim 21, further comprising instructions for collaborating between an application and an application DMA to disambiguate an associated query.

33. The program storage device of claim 32, further comprising instructions for disambiguating a query using one of a short term history, a long term history, a focus history, and a combination thereof.

34. A DMA (dialog manager and arbitrator) interface, comprising:
   a plurality of DMA instances that communicate with each other in a hierarchical tree framework to arbitrate between a plurality of applications and to arbitrate between sub-dialogs associated with a same application, wherein the plurality of DMA instances comprise:
      a root DMA (rDMA) which is a root of the hierarchical tree that arbitrates between the plurality of applications to determine a target application for a given user input event; and
      a plurality of application DMAs (aDMAs) which manage application dialogs and sub-dialogs and which arbitrate between application sub-dialogs,
   wherein the plurality of aDMAs comprise a main aDMA for each application which manages a main dialog of the application, wherein each main aDMA is a child of the rDMA,
   wherein the plurality of aDMAs further comprise one or more sub-dialog aDMAs for managing sub-dialogs within an application, wherein the one or more sub-dialog aDMAs within an application are descendants of the main aDMA of the application, wherein arbitration is performed by each parent DMA instance in the hierarchical tree using a bottom-up approach to determine a target aDMA which manages the main dialog or sub-dialog associated with the user input event.

35. The DMA interface of claim 34, wherein the DMA interface is implemented in a multi-modal platform.

36. The DMA interface of claim 34, wherein the DMA interface stores and manages application information.

37. The DMA interface of claim 34, wherein each of the root DMA and application DMAs maintain a list of events that are generated for a given user input.

38. The DMA interface of claim 34, wherein each of the root DMA and application DMAs maintain a list of tasks that have been executed for a given dialog session.

39. The DMA interface of claim 34, further comprising a mechanism for collaborating with an application to disambiguate a user input event.

40. The DMA interface of claim 34, wherein the root DMA comprises a registration table to maintain a list of registered application DMAs, and wherein the root DMA tracks which of the registered application DMAs is currently active.

41. The DMA interface of claim 34, wherein the root DMA communicates with an I/O manager, wherein the I/O manager abstracts user input events into modality-independent events for processing by the DMA interface, and wherein the I/O manager converts abstract output events into one or more modality-specific output events.

42. The DMA interface of claim 41, wherein the I/O manager comprises a central I/O manager and a modality agent for each modality supported by an underlying platform.

43. The DMA interface of claim 42, wherein the central I/O manager communicates with each modality agent using a common XML-based messaging protocol.

44. The DMA interface of claim 34, wherein the application DMAs communicate with a task manager for utilizing one or more conversational engines, wherein the task manager comprises a thread pool manager for tracking threads associated with the application DMAs, and an engine manager for communicating with conversational engine APIs.

45. The DMA interface of claim 44, wherein the engine manager communicates with a resource manager, wherein the resource manager designates a resource requested by the task manager.

46. The DMA interface of claim 34, further comprising a security mechanism for controlling information exchanges between application DMAs based on security settings registered by one or more applications.

47. The DMA interface of claim 46, wherein the security mechanism provides arbitration only among friend applications.

48. The DMA interface of claim 47, further comprising a mechanism for switching the arbitration function between groups of friend applications.

49. The DMA interface of claim 46, wherein the security mechanism comprises digital certificate certification.

50. The DMA interface of claim 46, wherein the security mechanism comprises encrypted information exchanges.

51. The DMA interface of claim 34, comprising a pluggable arbitration protocol.

52. The DMA interface of claim 51, wherein the arbitration protocol comprises one of a heuristics, deterministic and statistical algorithm.

53. The DMA interface of claim 34, wherein the DMA interface is employed in a voice portal.

54. The DMA interface of claim 53, wherein each application comprises an application browser that communicates with a main application DMA.

* * * * *